(12) United States Patent
Fujimoto

(10) Patent No.: US 11,297,354 B2
(45) Date of Patent: Apr. 5, 2022

(54) ENCODING APPARATUS, DECODING APPARATUS AND TRANSMISSION CONTROL METHOD

(71) Applicant: SONY CORPORATION, Tokyo (JP)

(72) Inventor: Yuji Fujimoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/807,908

(22) Filed: Mar. 3, 2020

(65) Prior Publication Data
US 2020/0204831 A1    Jun. 25, 2020

Related U.S. Application Data

(63) Continuation of application No. 15/735,514, filed as application No. PCT/JP2016/058940 on Mar. 22, 2016, now Pat. No. 10,609,419.

(30) Foreign Application Priority Data

Jun. 24, 2015 (JP) .............................. JP2015-126486

(51) Int. Cl.
*H04N 19/89* (2014.01)
*H04N 19/105* (2014.01)
(Continued)

(52) U.S. Cl.
CPC ........... *H04N 19/89* (2014.11); *H04N 19/105* (2014.11); *H04N 19/162* (2014.11);
(Continued)

(58) Field of Classification Search
CPC .... H04N 19/89; H04N 19/105; H04N 19/162; H04N 19/164; H04N 19/174; H04N 19/55; H04N 19/65; H04N 19/70; H04N 19/895
(Continued)

(56) References Cited

U.S. PATENT DOCUMENTS

2008/0055314 A1*  3/2008  Ziemski .................. G06T 11/40
                                                                        345/441
2009/0252227 A1   10/2009  Nepomucenoleung et al.
(Continued)

FOREIGN PATENT DOCUMENTS

AU    2013385808 A1    10/2015
CA     2908007 A1    10/2014
(Continued)

OTHER PUBLICATIONS

Non-Final Office Action for U.S. Appl. No. 15/735,514, dated Aug. 2, 2019, 22 pages.
(Continued)

*Primary Examiner* — Joseph G Ustaris
*Assistant Examiner* — Matthew David Kim
(74) *Attorney, Agent, or Firm* — Chip Law Group

(57) ABSTRACT

The present invention provides an encoding apparatus including a setting section that partitions each of images included in a video to be encoded into a plurality of tiles and sets a partial region including one or more of the plurality of tiles for the image, an encoding section that encodes each image on a per-tile basis to generate an encoded stream, and a transmission control section that controls transmission of the encoded stream to a decoding apparatus that decodes the video. The setting section sets out-of-tile reference for motion compensation for the tiles within the partial region to be prohibited, and the transmission control section restricts, upon detection of a loss or an absence of encoded information at the decoding apparatus, the transmission such that only an encoded stream corresponding to the tiles within the partial region is transmitted.

6 Claims, 29 Drawing Sheets

(51) Int. Cl.
  *H04N 19/174* (2014.01)
  *H04N 19/162* (2014.01)
  *H04N 19/164* (2014.01)
  *H04N 19/55* (2014.01)
  *H04N 19/65* (2014.01)
  *H04N 19/895* (2014.01)
  *H04N 19/70* (2014.01)

(52) U.S. Cl.
  CPC ......... *H04N 19/164* (2014.11); *H04N 19/174* (2014.11); *H04N 19/55* (2014.11); *H04N 19/65* (2014.11); *H04N 19/70* (2014.11); *H04N 19/895* (2014.11)

(58) Field of Classification Search
  USPC ........................................ 375/140.27, 240.27
  See application file for complete search history.

(56) References Cited

U.S. PATENT DOCUMENTS

| | | | |
|---|---|---|---|
| 2012/0114302 A1 | 5/2012 | Randall | |
| 2012/0281766 A1 | 11/2012 | Duenas et al. | |
| 2012/0287987 A1 | 11/2012 | Budagavi et al. | |
| 2013/0058394 A1 | 3/2013 | Nilsson et al. | |
| 2013/0141536 A1 | 6/2013 | Choe et al. | |
| 2014/0301464 A1* | 10/2014 | Wu | H04N 19/436 375/240.15 |
| 2015/0016504 A1 | 1/2015 | Auyeung et al. | |
| 2015/0146780 A1 | 5/2015 | Miyoshi et al. | |
| 2015/0249824 A1* | 9/2015 | Takada | H04N 19/507 382/232 |
| 2015/0294181 A1 | 10/2015 | Yamanaka et al. | |
| 2016/0100196 A1 | 4/2016 | Wu et al. | |
| 2016/0249010 A1* | 8/2016 | Greene | H04N 21/4755 |

FOREIGN PATENT DOCUMENTS

| | | |
|---|---|---|
| CN | 101983509 A | 3/2011 |
| CN | 102946533 A | 2/2013 |
| CN | 103430545 A | 12/2013 |
| CN | 103718553 A | 4/2014 |
| CN | 103733615 A | 4/2014 |
| CN | 103947213 A | 7/2014 |
| CN | 104094604 A | 10/2014 |
| CN | 104170384 A | 11/2014 |
| CN | 104221381 A | 12/2014 |
| CN | 105359512 A | 2/2016 |
| CN | 105432082 A | 3/2016 |
| EP | 2274914 A1 | 1/2011 |
| EP | 2737701 A1 | 6/2014 |
| EP | 2984823 A1 | 2/2016 |
| GB | 2495468 A | 4/2013 |
| JP | 07-095564 A | 4/1995 |
| JP | 07-095588 A | 4/1995 |
| JP | 09-037245 A | 2/1997 |
| JP | 2003-259375 A | 9/2003 |
| JP | 2011-517233 A | 5/2011 |
| JP | 2014-519247 A | 8/2014 |
| JP | 2014-528200 A | 10/2014 |
| JP | 2015-106747 A | 6/2015 |
| KR | 10-2010-0131520 A | 12/2010 |
| KR | 10-2014-0028059 A | 3/2014 |
| KR | 10-2014-0056316 A | 5/2014 |
| KR | 10-2015-0140360 A | 12/2015 |
| KR | 10-2016-0019091 A | 2/2016 |
| TW | 201004356 A | 1/2010 |
| WO | 2009/126583 A1 | 10/2009 |
| WO | 2012/151549 A1 | 11/2012 |
| WO | 2013/033676 A1 | 3/2013 |
| WO | 2014/045507 A1 | 3/2014 |
| WO | 2014/168650 A1 | 10/2014 |
| WO | 2015/009676 A1 | 1/2015 |

OTHER PUBLICATIONS

Notice of Allowance for U.S. Appl. No. 15/735,514, dated Nov. 20, 2019, 07 pages.

"Series H: Audiovisual and Multimedia Systems Infrastructure of audiovisual services Coding of moving video", High Efficiency Video Coding, ITU-T Telecommunication Standardization Sector of ITU, H.265, Oct. 2014, 540 pages.

International Preliminary Report on Patentability of PCT Application No. PCT/JP2016/058940, dated Jan. 4, 2018, 07 pages of English Translation and 04 pages of IPRP.

International Search Report and Written Opinion of PCT Application No. PCT/JP2016/058940, dated Jun. 21, 2016, 07 pages of English Translation and 08 pages of ISRWO.

Office Action for JP Patent Application No. 2019-237263 dated Dec. 8, 2020, 04 pages of Office Action and 04 pages of English Translation.

Hattori et al., "HLS: Extensions to Temporal Motion constrained tile sets SEI message", Joint Collaborative Team on Video Coding, (JCT-VC) of ITU / T SG 16 WP 3 and ISO/IEC JTC 1/SC 29/WG 11, Jan. 2014, pp. 1-9.

Office Action for CN Patent Application No. 201680034998.4, dated Apr. 14, 2021, 08 pages of English Translation and 06 pages of Office Action.

\* cited by examiner

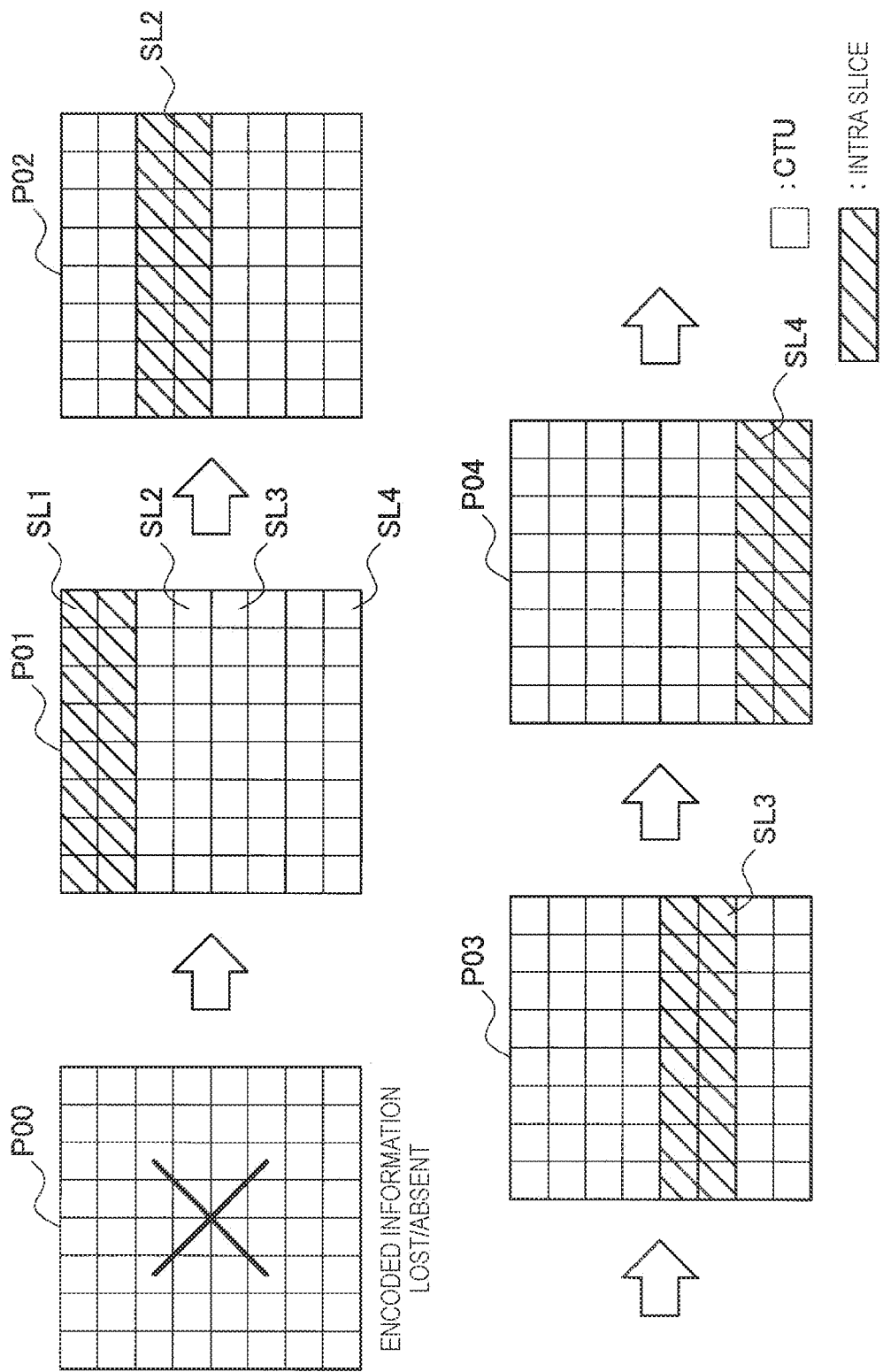

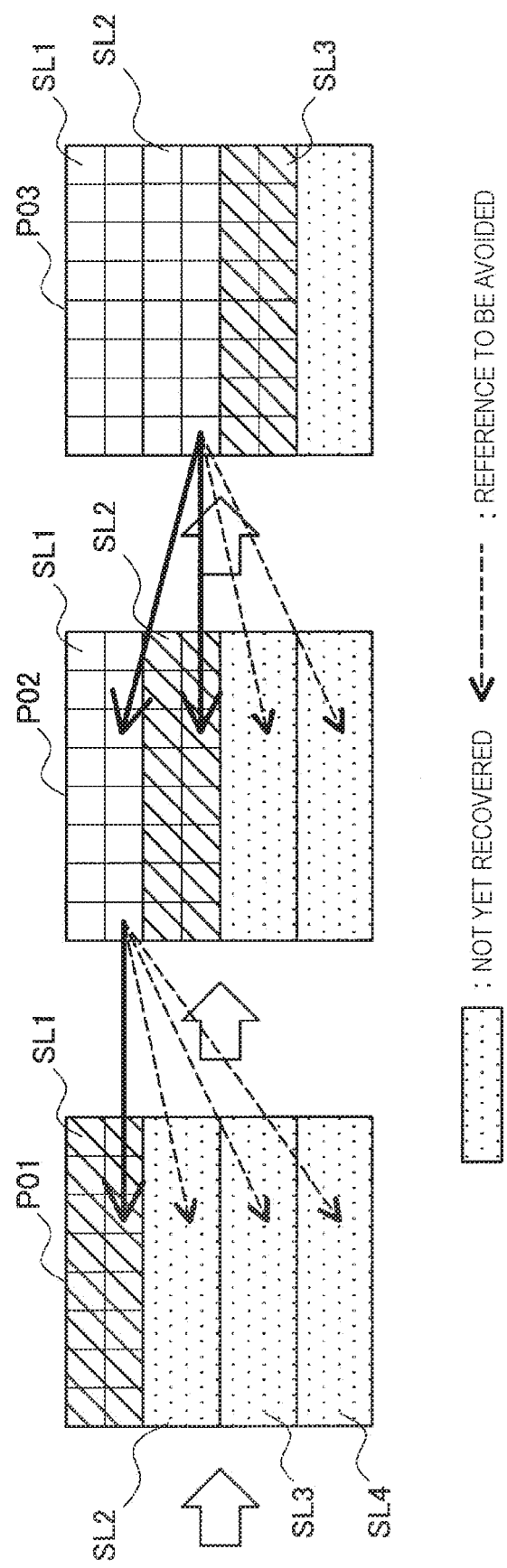

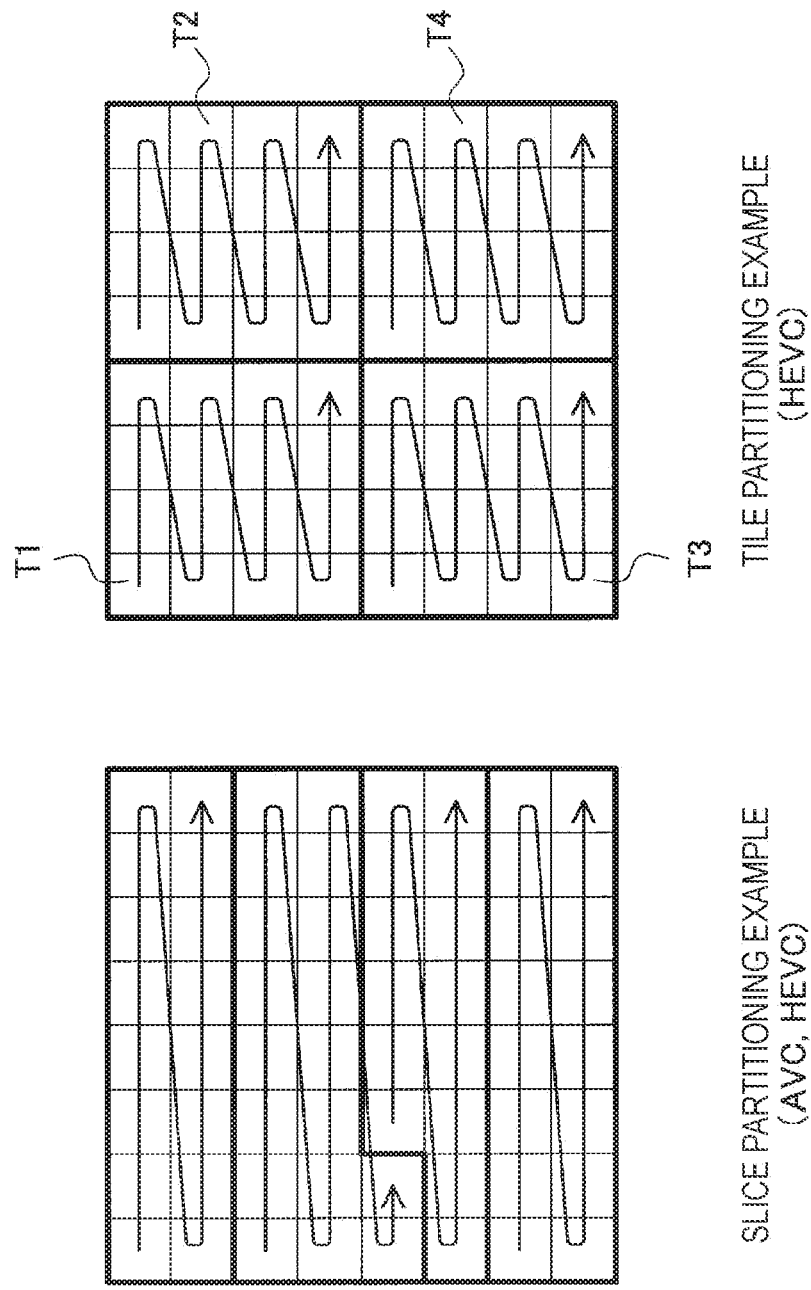

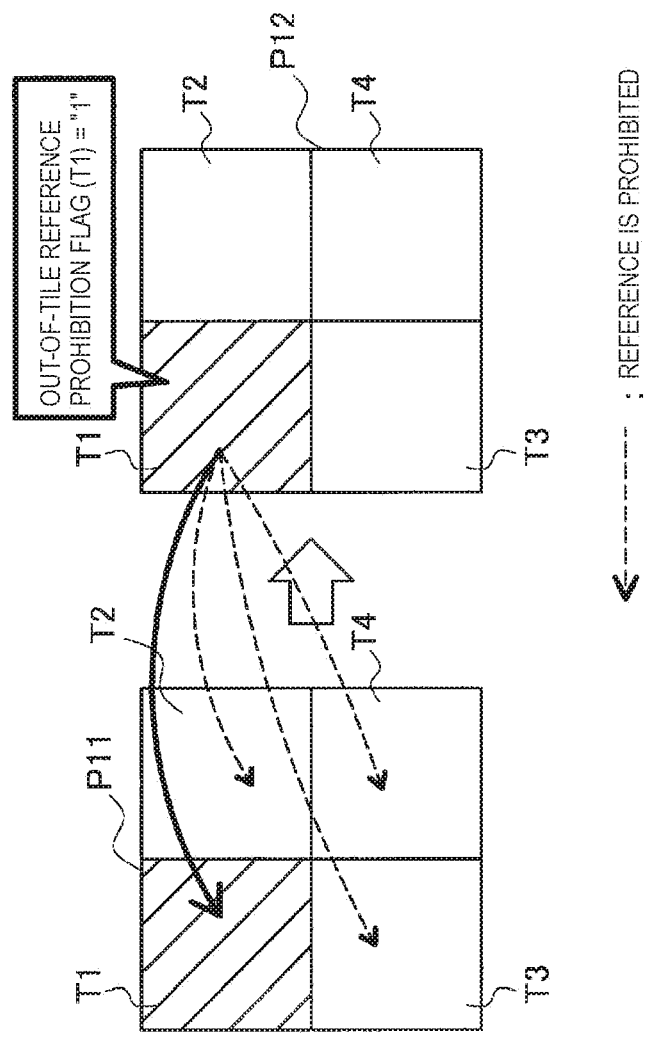

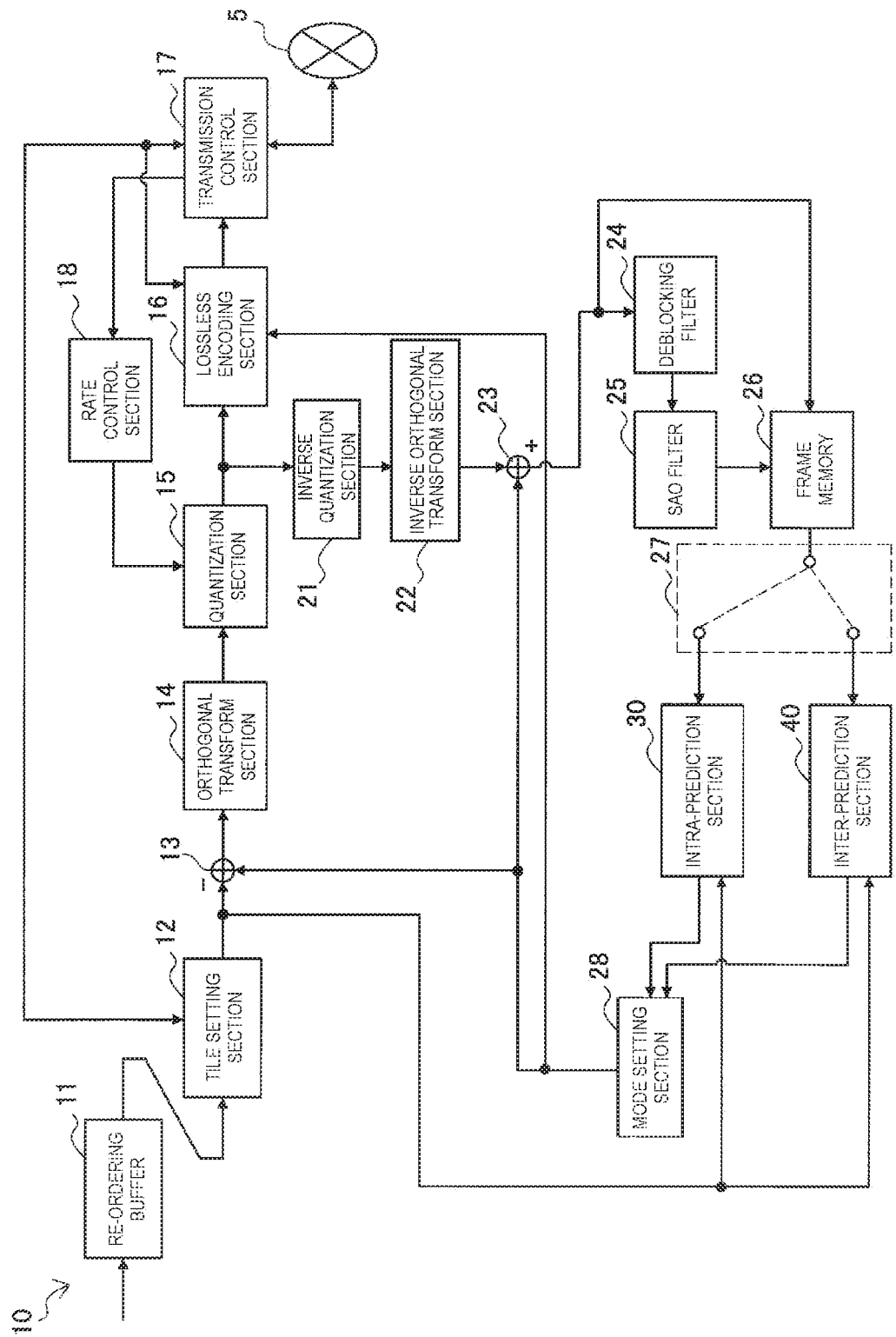

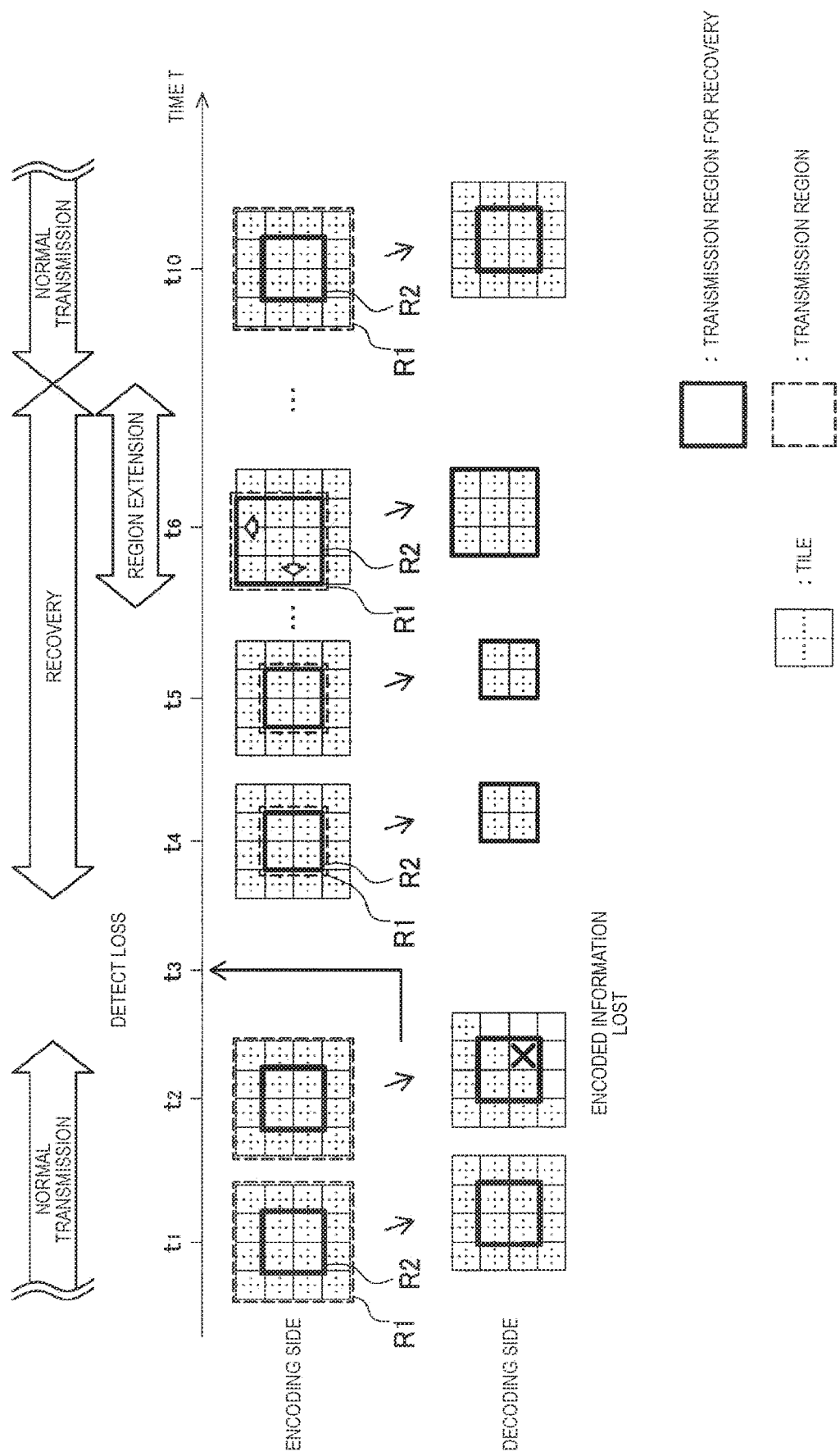

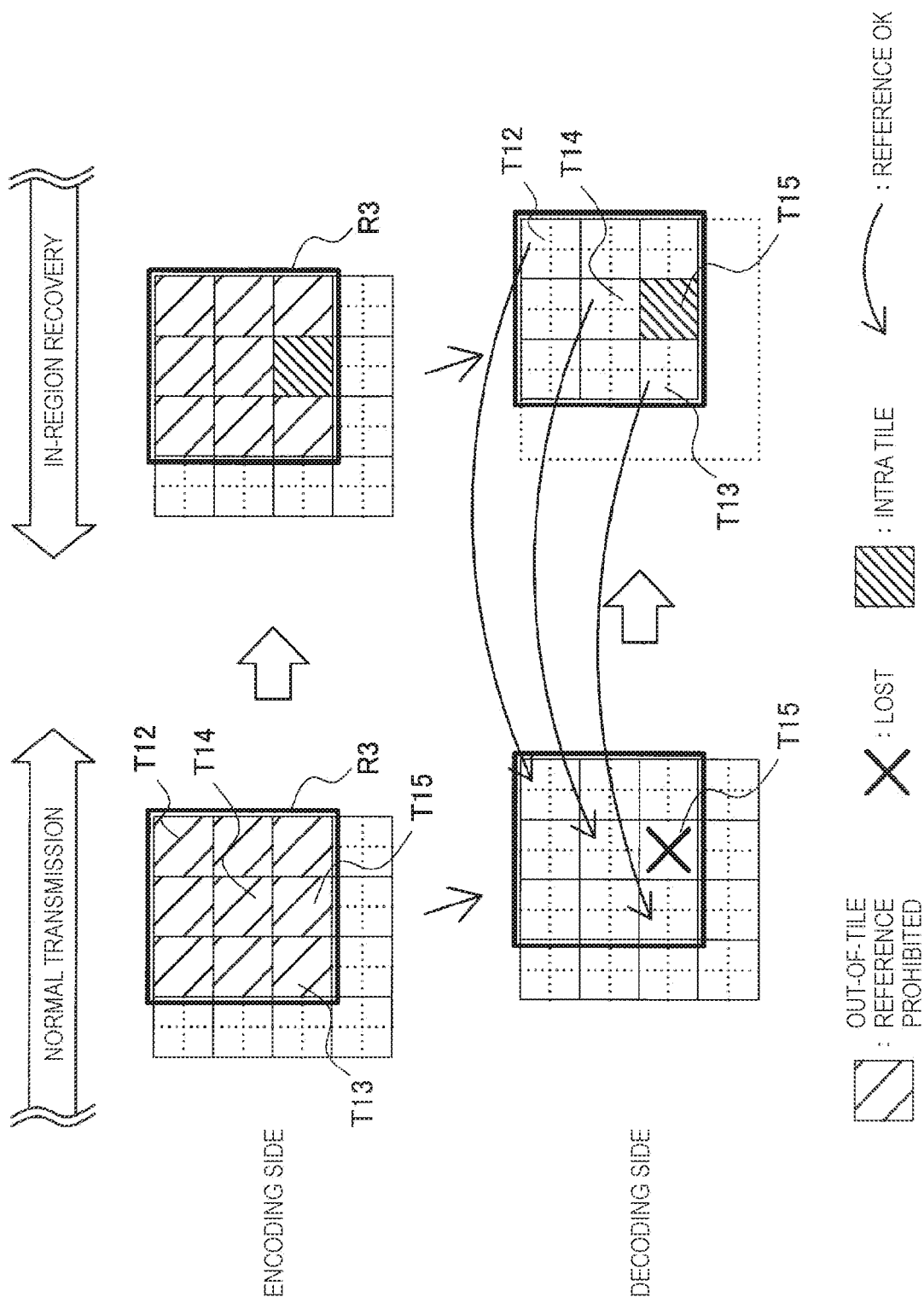

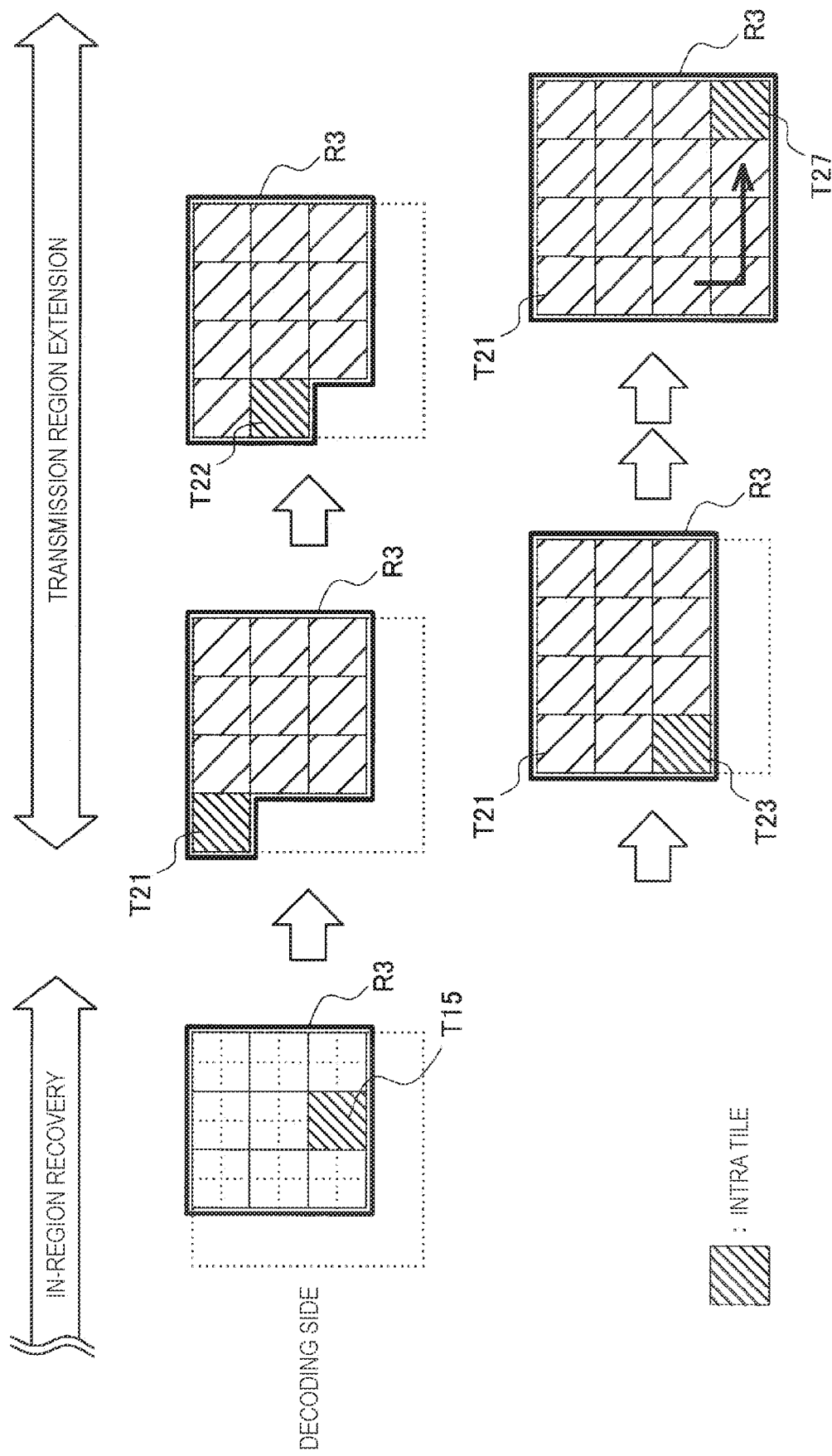

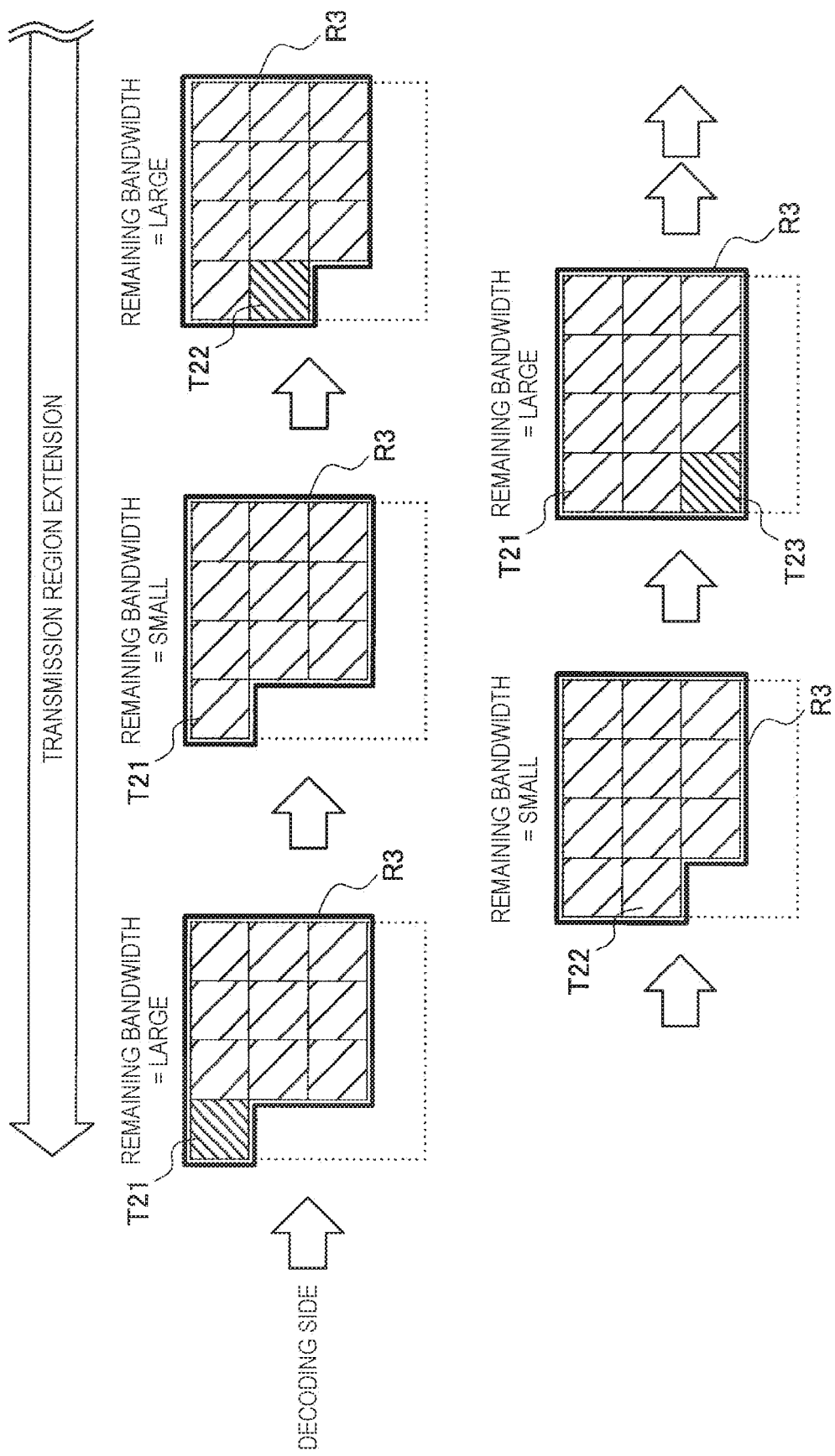

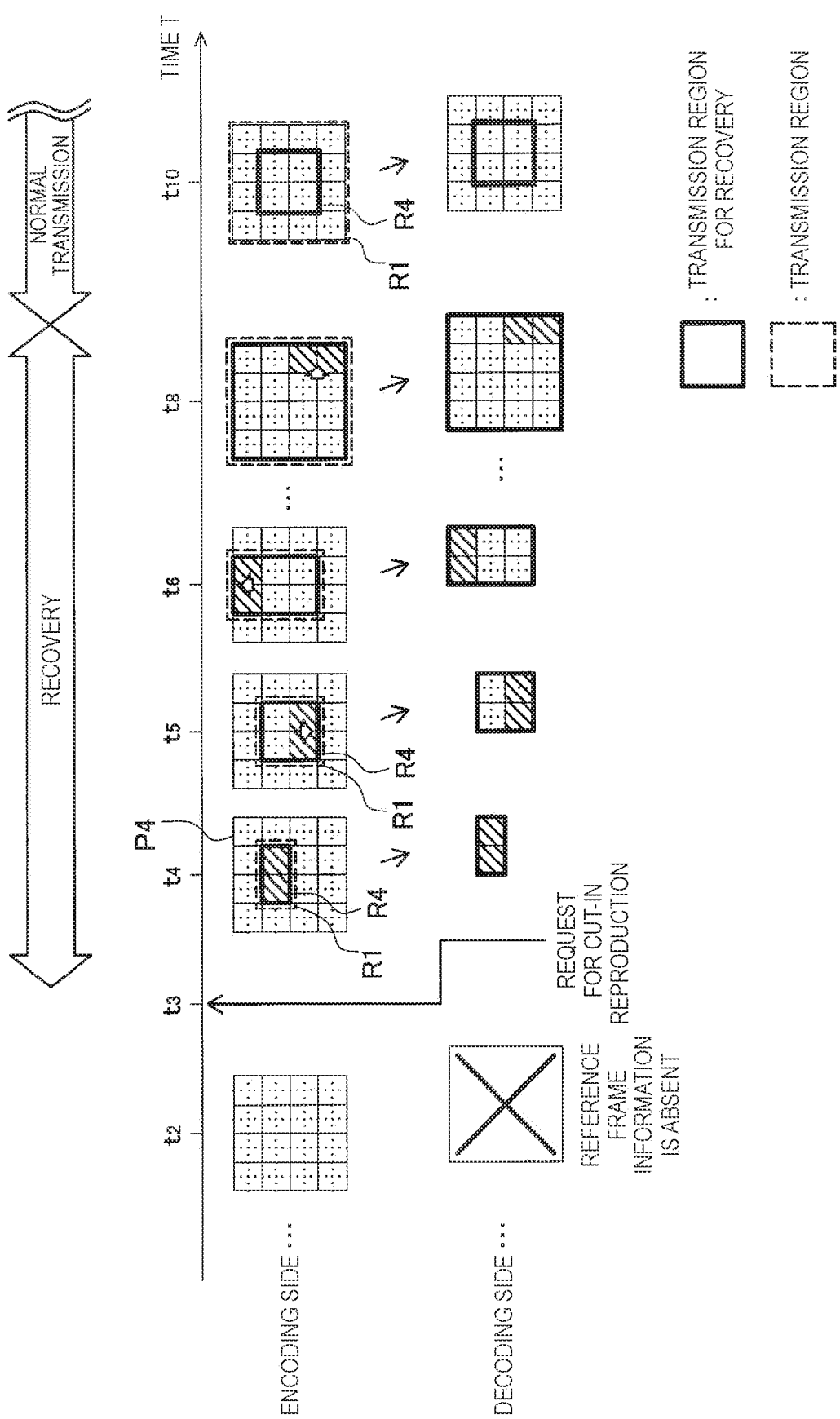

FIG. 18
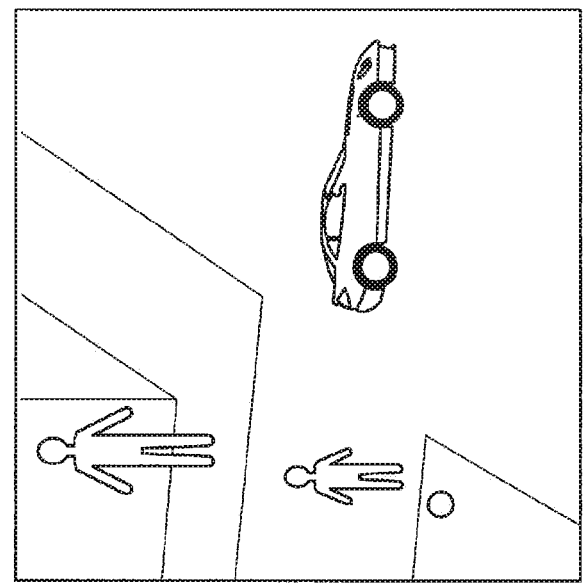
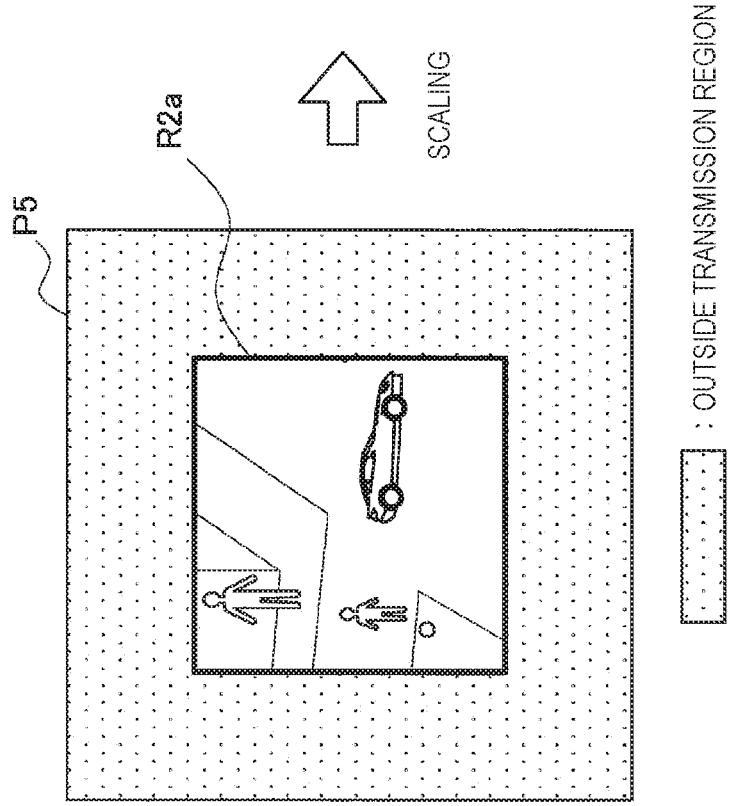

ENCODING APPARATUS, DECODING APPARATUS AND TRANSMISSION CONTROL METHOD

CROSS REFERENCE TO RELATED APPLICATIONS

The present application is a continuation application of U.S. patent application Ser. No. 15/735,514, filed on Dec. 11, 2017, which is a National Stage Entry of Patent Application No. PCT/JP2016/058940, filed on Mar. 22, 2016, which claims priority from Japanese Patent Application No. JP 2015-126486 filed in the Japan Patent Office on Jun. 24, 2015, the entire content of which is hereby incorporated by reference.

TECHNICAL FIELD

The present disclosure relates to an encoding apparatus, a decoding apparatus and transmission control methods.

BACKGROUND ART

Dissemination of high-end terminals and outspread of wired and wireless networks have given rise to more and more increased opportunities to transmit or view videos via networks. When a video is to be transmitted on a real-time basis or at least with low latency using a limited network bandwidth, the video is usually encoded with compression coding and rate-controlled to be matched with the bandwidth prior to transmission. Intended purposes of such video transmissions include, for example, video conference, video chat, monitoring through security cameras and distribution of live videos (for sports, concerts, etc.).

Conventional compression coding technologies such as MPEG-2 and H.264/AVC provide support of motion compensation based on inter-frame prediction (inter-prediction) in addition to intra-frame prediction (intra-prediction) thereby achieving high coding efficiency. However, in a case where encoded information that would have transmitted becomes unavailable due to any reason such as a packet loss, the inter-frame prediction will not work well and decoding of contents will fail. Upon such a failure, it is possible to recover normal decoding/reproduction of the contents by transmitting at least one image encoded solely with intra-prediction (herein referred to as I (Intra) picture). This type of transmission is called 'refresh'. However, as an amount of codes of an I picture is generally significantly large compared to the other types of pictures (for example, P pictures or B pictures for which motion compensation is usable), transmission delay or another decoding failure may occur during recovery.

The patent literature 1 discloses a technology to suppress increase in the amount of codes during the above-mentioned refresh by performing the refresh in a distributed manner over a plurality of frames per a partial region basis. The patent literature 2 discloses a technology to dynamically control search area of motion compensation such that no inter-frame reference is made to a region that has not yet recovered in performing the distributed refresh over a plurality of frames.

H.265/HEVC (hereinafter, referred to as HEVC) is a compression coding technology subsequent to H.264/AVC, that was standardized by the Joint Collaboration Team-Video Coding (JCTVC) which is the joint standards group of the ITU-T and the ISO/IEC (see the non-patent literature 1).

CITATION LIST

Patent Literature

Patent Literature 1:
JP H7-95564A
Patent Literature 2:
JP H7-95588A

Non-Patent Literature

Non-Patent Literature 1:ITU-T, "H.265: High efficiency video coding", Recommendation ITU-T H.265, October, 2014

DISCLOSURE OF INVENTION

Technical Problem

Sine the conventional distributed refresh over a plurality of frames requires a complicated control on inter-frame references as described in the patent literature 2, there has been difficulty in achieving simple device implementations.

Thus, there is still a need for a technology which can provide simpler implementations.

Solution To Problem

According to the present disclosure, there is provided an encoding apparatus including: a setting section configured to partition each of images included in a video to be encoded into a plurality of tiles and set a partial region including one or more of the plurality of tiles for the image; an encoding section configured to encode each image on a per-tile basis to generate an encoded stream; and a transmission control section configured to control transmission of the encoded stream to a decoding apparatus that decodes the video. The setting section is configured to set out-of-tile reference for motion compensation for the tiles within the partial region to be prohibited, and the transmission control section is configured to restrict, upon detection of a loss or an absence of encoded information at the decoding apparatus, the transmission such that only an encoded stream corresponding to the tiles within the partial region is transmitted.

In addition, according to the present disclosure, there is provided a transmission control method of controlling, in an encoding apparatus, transmission of a video to a decoding apparatus, the method including: partitioning each of images included in a video to be encoded into a plurality of tiles; setting a partial region including one or more of the plurality of tiles for the image; encoding each image on a per-tile basis to generate an encoded stream; and controlling transmission of the encoded stream to the decoding apparatus. Out-of-tile reference for motion compensation for the tiles within the partial region is set to be prohibited, and upon detection of a loss or an absence of encoded information at the decoding apparatus, the transmission is restricted such that only an encoded stream corresponding to the tiles within the partial region is transmitted.

In addition, according to the present disclosure, there is provided a decoding apparatus including: a transmission control section configured to provide an encoding apparatus with region information regarding a partial region including one or more of a plurality of tiles of an image included in a video to be decoded, the encoding apparatus being a transmission source of the video; and a decoding section configured to decode an encoded stream of the video received from the encoding apparatus to obtain the video. In a normal operation, an encoded stream corresponding to all of the plurality of tiles is received, and upon detection of a loss or an absence of necessary encoded information, only an encoded stream corresponding to the tiles within the partial region being set on the basis of the region information is received with out-of-tile reference for motion compensation for the tiles within the partial region prohibited.

In addition, according to the present disclosure, there is provided a transmission control method of controlling, in a decoding apparatus, transmission of a video from an encoding apparatus, the method including: providing an encoding apparatus with region information regarding a partial region including one or more of a plurality of tiles of an image included in a video to be decoded, the encoding apparatus being a transmission source of the video; receiving an encoded stream of the video from the encoding apparatus; and decoding the received encoded stream to obtain the video. In a normal operation, the encoded stream corresponding to all of the plurality of tiles is received, and upon detection of a loss or an absence of necessary encoded information, only an encoded stream corresponding to the tiles within the partial region being set on the basis of the region information is received with out-of-tile reference for motion compensation for the tiles within the partial region prohibited.

Advantageous Effects of Invention

The technology according to the present disclosure makes it possible to implement, in a simple manner, a mechanism to obtain an appropriately decoded video in a situation where encoded information for decoding the video has been lost or has become absent.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1A is an illustrative diagram for describing a distributed refresh using slice partitioning.

FIG. 1B is an illustrative diagram for describing control on inter-frame references in a distributed refresh using slice partitioning.

FIG. 2A is an illustrative diagram which contrastively shows slice partitioning and tile partitioning.

FIG. 2B is an illustrative diagram for describing settings for prohibition of out-of-tile reference in HEVC.

FIG. 4 is a block diagram illustrating an example of a configuration of an encoding apparatus.

FIG. 5 is an illustrative diagram for describing a basic idea of a transmission region for recovery.

FIG. 7 is an illustrative diagram for describing an example of an in-region recovery.

FIG. 8 is an illustrative diagram for describing the first example of extending a transmission region.

FIG. 9 is an illustrative diagram for describing the second example of extending a transmission region.

FIG. 10 is an illustrative diagram for describing an example of recovery at a cut-in reproduction.

FIG. 18 is an illustrative diagram for describing an example of scaling a partial image.

MODE(S) FOR CARRYING OUT THE INVENTION

Figure 3:
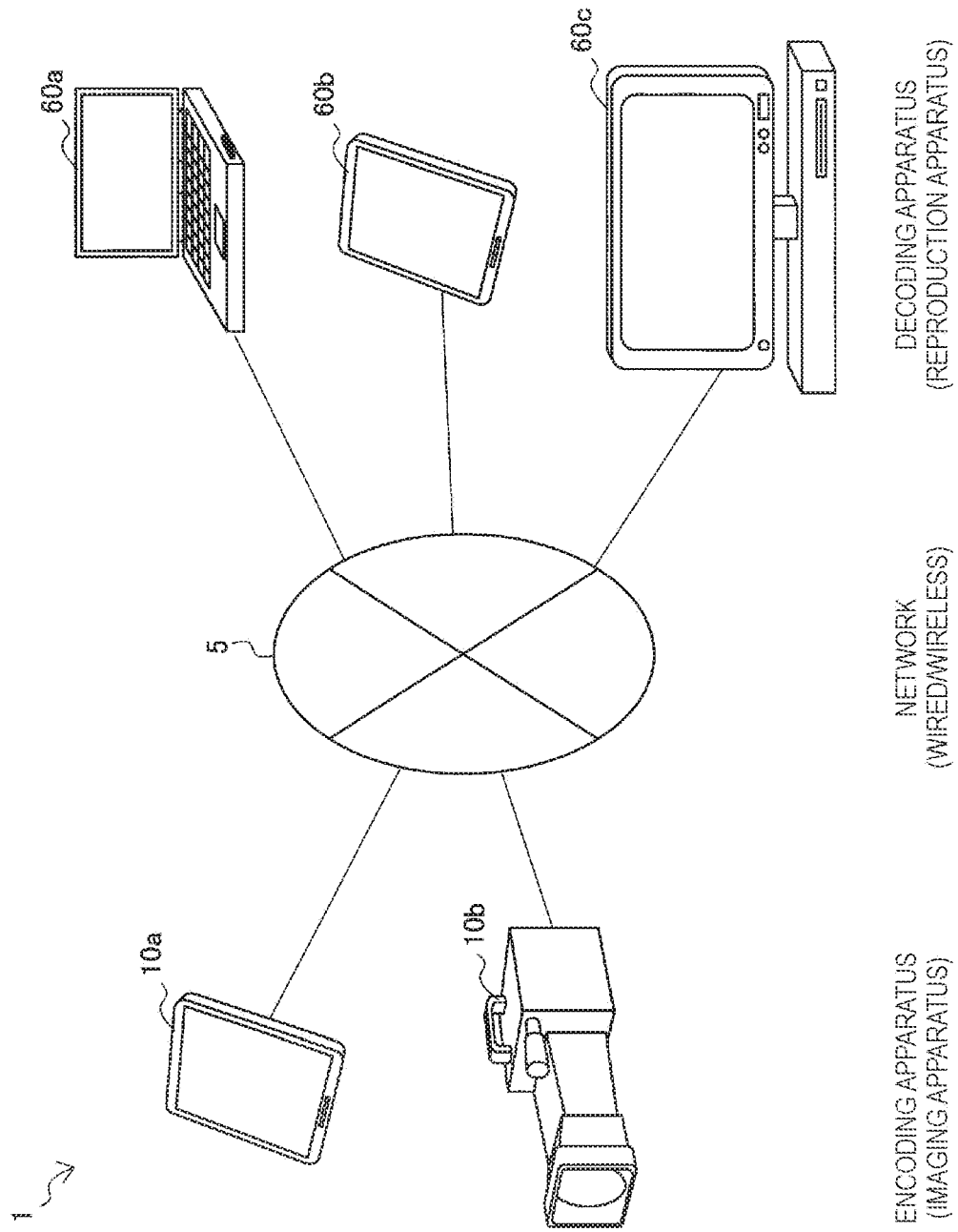
FIG. 3 is a block diagram illustrating an example of a configuration of video transmission system according to an embodiment.

Hereinafter, preferred embodiments of the present disclosure will be described in detail with reference to the appended drawings. In this specification and the appended drawings, structural elements that have substantially the same function and structure are denoted with the same reference numerals, and repeated explanations thereof will be omitted.

In addition, description will be provided in the following order.

1. Introduction
   1-1. Explanation of Related Technologies
   1-2. Tile Partitioning in HEVC
2. System Overview
3. Configuration of Encoding Apparatus
   3-1. Basic Configuration
   3-2. Setting Transmission Region for Recovery
   3-3. Recovery upon Packet Loss
   3-4. Recovery Triggered by Other Events
4. Flow of Process during Encoding
5. Configuration of Decoding Apparatus 6. Flow of Process during Decoding
7. Example of Hardware Configuration
8. Application Examples
9. Conclusion

1. INTRODUCTION

[1-1. Explanation of Related Technologies]

As described above, many of conventional compression coding technologies provide support of two kinds of prediction coding modes, i.e. intra-prediction and inter-prediction. The inter-prediction involves motion compensation based on inter-frame prediction and contributes to achieving high coding efficiency. However, due to a loss or an absence of encoded information to be referred to, inter-frame prediction sometimes may not work well resulting in a decoding failure. After the decoding failure occurred, it is possible to recover normal decoding/reproduction of the contents by transmitting at least one I picture encoded solely with intra-prediction. However, during this refresh, there is a risk that an increase in an amount of codes to encode the I picture causes a delay of transmission or another decoding failure. The distributed refresh as disclosed in the patent literature 1 and 2 suppresses such an increase in an amount of code during a recovery period.

The distributed refresh can be implemented, for example, using slice partitioning supported by H.264/AVC and HEVC. Slices are a type of units for encoding process, which are formed by partitioning a picture into stripes along the horizontal direction. FIG. 1A is an illustrative diagram for describing the distributed refresh using slice partitioning. With reference to FIG. 1A, the pictures P00, P01, P02, P03 and P04 are arranged in a decoding order. Each of these pictures is partitioned, as an example, into four slices SL1, SL2, SL3 and SL4. It is assumed here that a decoding failure has occurred in the picture P00 due to a loss or an absence of encoded information. An encoder, which has recognized the decoding failure, sets the slice SL1 of the succeeding first picture P01 to be an intra slice. If only the slice SL1 among the four slices SL1, SL2, SL3 and SL4 is encoded as an intra slice, an increase in an amount of codes is suppressed compared to a case where the entire picture P01 is set to be an intra picture. Next, the encoder encodes the slice SL2 of the second picture P02, the slice SL3 of the third picture P03 and the slice SL4 of the fourth picture P04 in turn as an intra slice. Once decoding is completed at a decoder side for such four slices that have been sequentially set to be an intra slice, normal decoding/reproduction of an entire picture will be possible again.

If setting of the intra slices are distributed across a plurality of frames as shown in FIG. 1A, it will be more likely that a peak of a generated amount of codes falls within a transmission bandwidth. However, in order to adequately decode the contents, an additional control as described next is further required. FIG. 1B is an illustrative diagram for describing control on inter-frame references in a distributed refresh using slice partitioning. In FIG. 1B, the pictures P01, P02 and P03 out of the pictures shown in FIG. 1A are shown again. At a time point when the picture P01 is decoded, the slice SL1 is decodable as long as there is no new loss of information since the slice SL1 is an intra slice. Meanwhile, the slices SL2, SL3 and SL4 may be non-decodable (that is, are not recovered at this time point) since they are not intra slices and thus may be affected by a decoding failure of a preceding picture. At a time point when the picture P02 is decoded, the slice SL2 is in turn an intra slice and the slice SL2 is thus decodable. The slices SL3 and SL4 are still not recovered since they are not yet intra slices. The slice SL1 has already been recovered and it is not an intra slice. This leads to the fact that the slice SL1 will be non-decodable again if it refers, for example, to the slice SL2, SL3 or SL4 of the reference picture P01 (they have not yet been recovered). Hence, the encoder controls the inter-frame prediction for the slice SL1 of the picture P02 that might be a P or B slice such that the slices SL2, SL3 and SL4 of the picture P01 are not referred to. Similarly, the encoder controls the inter-frame prediction for the slices SL1 and SL2 of the picture P03 that might be P or B slices such that the slices SL3 and SL4 of the picture P02 (and other non-decodable slices of preceding pictures) are not referred to.

As such, the conventional technique of distributed refresh requires developers of devices to additionally implement relatively complicated control of inter-frame prediction though the distributed refresh can be employed in combination of slice partitioning of H.264/AVC. Hence, it is still desirable to provide a technology which allows stable video transmission to be realized with a simpler implementation in a situation where only a limited transmission bandwidth is available, assuming a real-time or at least low latency transmission. The inventor of the technology according to the present disclosure has recognized that the tile partitioning adopted in HEVC is a suitable framework for such a simple implementation.

[1-2. Tile Partitioning in HEVC]

FIG. 2A contrastively shows slice partitioning in H.264/AVC or HEVC and tile partitioning in HEVC. Slices are formed by partitioning a picture into stripes along the horizontal direction as described above. A boundary between a slice and a next slice may not necessarily be at an edge of a picture and any boundary between two consecutive LCUs among LCUs arranged in a raster scanning order in a picture can be a slice boundary (an example is shown at the left half of FIG. 2A). Meanwhile, tiles are formed by partitioning a picture by a grid pattern. In an example of the right half of FIG. 2A, there are four tiles T1 to T4 in total formed by two rows and two columns. When a picture is encoded or decoded, the LCUs are processed in the raster scanning order within each tile (see the arrows in the figure). Because there is no dependency between tiles in the same picture with few exceptions such as a loop filter, parallel processing across tiles is possible. Note that the example of FIG. 2A is not a limitation and sizes of tiles in a picture may not be uniform.

In HEVC, the syntax of temporal motion-constrained tile sets SEI message, which is one of the supplemental enhancement information (SEI) messages designating extensional supplemental information, includes parameters defining whether or not out-of-tile reference is done or not. The following table shows the syntax of this message as specified in the non-patent literature 1.

TABLE 1

Syntax of Temporal Motion-Constrained Tile Sets SEI message temporal_motion_constrained_tile_sets( payloadSize ) {

| | |
|---|---|
| 1 | mc_all_tiles_exact_sample_value_match_flag |
| 2 | each_tile_one_tile_set_flag |
| 3 | if( !each_tile_one_tile_set_flag ) { |
| 4 | limited_tile_set_display_flag |
| 5 | num_sets_in_message_minus1 |
| 6 | for( i = 0; i <= num_sets_in_message_minus1; i++ ) { |
| 7 | mcts_id[i] |
| 8 | if( limited_tile_set_display_flag ) |

TABLE 1-continued

Syntax of Temporal Motion-Constrained Tile Sets SEI message

```
    temporal_motion_constrained_tile_sets( payloadSize ) {
9       display_tile_set_flag[i]
10      num_tile_rects_in_set_minus1[i]
11      for( j = 0; j <= num_tile_rects_in_set_minus1[ i ]; j++) {
12          top_left_tile_index[i][j]
13          bottom_right_tile_index[i][j]
14      }
15      if( !mc_all_tiles_exact_sample_value_match_flag )
16          mc_exact_sample_value_match_flag[i]
17          mcts_tier_level_idc_present_flag[i]
18      if( mcts_tier_level_idc_present_flag[i] ) {
19          mcts_tier_flag[i]
20          mcts_level_idc[i]
21      }
22      }
23      } else {
24          max_mcs_tier_level_idc_present_flag
25      if( mcts_max_tier_level_idc_present_flag ) {
26          mcts_max_tier_flag
27          mcts_max_level_idc
28      }
29      }
30  }
```

If the flag mc_all_tiles_exact_sample_value_match_flag at the first row of the table is True (equals "1"), each tile within the tile set is encoded without referring to another tile and boundaries of tiles are treated similarly to picture boundaries. That is, in this case, out-of-tile reference is prohibited commonly within the tile set. If the flag mc_exact_sample_value_match_flag[i] at the sixteenth row is True, the i-th tile within the tile set is encoded without referring to another tile and boundaries of the i-th tile are treated similarly to picture boundaries. That is, by utilizing the flag mc_exact_sample_value_match_flag[i], it is possible to prohibit or allow out-of-tile reference for a particular tile. In this specification, at least one flag of these flags is referred to as out-of-tile reference prohibition flag. If the flag limited_tile_set_display_flag at the fourth row is True, the flag(s) display_tile_set_flag[i] at the ninth row are encoded for i tile(s), respectively. If the flag display_tile_set_flag[i] is True, it is intended to display the i-th tile. Thus, the flag display_tile_set_flag[i] can be utilized for an encoder to indicate that each tile should be displayed or should not be displayed for each tile at the decoder side.

FIG. 2B is an illustrative diagram for describing settings for prohibition of out-of-tile reference in HEVC. In FIG. 2B, the pictures P11 and P12 are shown, each of which is partitioned into tiles T1 to T4. The picture P12 is a picture that follows the picture P11. As an example, in a case where the out-of-tile reference prohibition flag is set to True for the tile T1, the tile boundaries between the tile T1 and other tiles are treated similarly to picture boundaries when the picture P12 is decoded. In motion compensation of the tile T1, it is prohibited to refer to the tiles T2, T3 and T4 of the picture P11 (or other reference pictures). Meanwhile, it is not prohibited to refer from the tile T1 of the picture P12 to the tile T1 of the picture P11 (i.e. in-tile reference). As such, the framework of tile partitioning adopted in HEVC has been designed in a manner that it is suitable for controlling reference relationship between partial regions of images. This framework mainly aimed at realizing an advanced parallel processing in a decoder. However, as described from the next section as embodiments of the technology according to the present disclosure, the framework of tile partitioning can be utilized for implementing the distributed refresh.

2. SYSTEM OVERVIEW

FIG. 3 shows an example of a configuration of video transmission system 1 according to an embodiment of the technology according to the present disclosure. The video transmission system 1 includes at least one encoding apparatus 10a, 10b and at least one decoding apparatus 60a, 60b, 60c. These apparatuses are connected to each other via the network 5.

In the example of FIG. 3, the encoding apparatus 10a is a mobile terminal such as a tablet personal computer (PC) or a smart phone. The encoding apparatus 10b is a video camera. In this specification, the encoding apparatuses 10a and 10b are collectively denoted as encoding apparatuses 10 in a context where it is not necessary to discriminate between them. The encoding apparatus 10 has an encoder for encoding a video captured by itself or by another apparatus and transmits the encoded stream generated by the encoder to a decoding apparatus 60 via the network 5 by streaming transmission. A communication interface for network communication may be arranged either within or outside the encoding apparatus 10.

In the example of FIG. 3, the decoding apparatus 60a is a notebook PC. The decoding apparatus 60b is a mobile terminal such as a tablet PC or a smart phone. The decoding apparatus 60c is a television receiver. In this specification, the decoding apparatuses 60a, 60b and 60c are collectively denoted as decoding apparatuses 60 in a context where it is not necessary to discriminate between them. The decoding apparatus 60 has a decoder for decoding an encoded stream, which is received via the network 5, to obtain a video. The decoding apparatus 60 may further include a display for reproducing a video obtained through decoding by the decoder. A communication interface and a display may be arranged either within or outside the decoding apparatus 60.

The network 5 may be a wireless network such as GSM, Long Term Evolution (LTE), LTE-Advanced, WiMAX or wireless local area network (LAN) or a wired network. The network 5 may involve, at least at a portion of itself, a link with narrow bandwidth. The encoding apparatus 10 and the decoding apparatus 60 utilize the above-described tile partitioning framework such that a peak of an amount of codes of transmitted/received encoded stream does not exceed the bandwidth of the network 5.

3. CONFIGURATION OF ENCODING APPARATUS

[3-1. Basic Configuration]
FIG. 4 is a block diagram illustrating an example of a configuration of the encoding apparatus 10. With reference to FIG. 4, the encoding apparatus 10 has a re-ordering buffer 11, a tile setting section 12, a subtraction section 13, an orthogonal transform section 14, a quantization section 15, a lossless encoding section 16, a transmission control section 17, a rate control section 18, an inverse quantization section 21, an inverse orthogonal transform section 22, an addition section 23, a deblocking filter 24, an SAO filter 25, a frame memory 26, a switch 27, a mode setting section 28, an intra-prediction section 30, and an inter-prediction section 40.

The re-ordering buffer 11 re-orders image data of a sequence of images constituting a video to be encoded in accordance with a Group of Pictures (GOP) structure associated with the encoding process. The re-ordering buffer 11 outputs the image data after re-ordering to the tile setting section 12, the intra-prediction section 30, and the inter-prediction section 40.

The tile setting section 12 partitions each of images, which corresponds to a picture, into a plurality of tiles. Each picture may include any number of tiles, and each tile may have any size. A mode of tile partitioning (the number of tiles and the size of each tile) may typically be kept unchanged for a plurality of frames, but may also be changed at any timing.

In the embodiment, the tile setting section 12 sets a transmission region for recovery, for the image to be encoded, which is a partial region including one or more of the plurality of tiles. The transmission region for recovery is a region that is targeted for transmission during a time after a loss or an absence of encoded information at a decoding side has been detected by the encoding apparatus 10 or the decoding apparatus 60 and until a recovery is completed. Some examples of techniques for setting the transmission region for recovery will be further described later. The tile setting section 12 also controls settings of prediction coding modes per each tile during recovery. For example, as further described later, a tile out of tiles within the transmission region for recovery, which has become non-decodable due to the loss or the absence of the encoded information, is set to be an intra tile at least once during recovery. The intra tile is a tile in which only intra-prediction is used for prediction coding for every block therein. On the other hand, the entire picture may be a target of transmission during normal period when an encoded stream is successfully transmitted.

The typical processing at the encoder from the subtraction section 13 to the inter-prediction section 40 as described below is performed on a per-tile basis according to the tile partitioning by the tile setting section 12. The tile setting section 12 sets out-of-tile reference for motion compensation for the tiles within the transmission region for recovery to be prohibited. The tile setting section 12 then creates tile information including tile parameters indicative of a mode of tile partitioning and the above mentioned out-of-tile reference prohibition flag and output the created tile information to the lossless encoding section 16.

The subtraction section 13 calculates prediction error data which is a difference between the image data input from the tile setting section 12 and predicted image data and outputs the calculated prediction error data to the orthogonal transform section 14.

The orthogonal transform section 14 performs an orthogonal transform process on each of one or more TUs configured within CTUs in each tile. The orthogonal transform performed here may be, for example, a discrete cosine transform or a discrete sine transform. More specifically, the orthogonal transform section 14 transforms, for each TU, the prediction error data input from the subtraction section 13 into transform coefficient data in the frequency domain from an image signal in the spatial domain. Then, the orthogonal transform section 14 outputs the transform coefficient data to the quantization section 15.

The transform coefficient data input from the orthogonal transform section 14 is fed to the quantization section 15 along with a rate control signal fed from the rate control section 18 which will be described later. The quantization section 15 quantizes the transform coefficient data by a quantization step determined in accordance with the rate control signal. The quantization section 15 outputs the quantized transform coefficient data (hereinafter, referred to as quantized data) to the lossless encoding section 16 and the inverse quantization section 21.

The lossless encoding section 16 encodes the quantized data input from the quantization section 15 for each tile thereby generating an encoded stream. In addition, the lossless encoding section 16 encodes various parameters to be referred to by a decoder and inserts the encoded parameters into the encoded stream. The parameters encoded by the lossless encoding section 16 can include the above-described tile information, information regarding intra-prediction, and information regarding inter-prediction. The lossless encoding section 16 outputs the generated encoded stream to the transmission control section 17.

The transmission control section 17 controls transmission of the encoded stream input from the lossless encoding section 16 to the decoding apparatus 60 via the network 5. The transmission control section 17 initiates transmission of the encoded stream of a video content, for example, in response to receiving a transmission request from the decoding apparatus 60. The encoded stream transmitted by the transmission control section 17 is an encoded stream corresponding to one or more tiles included in a transmission region. Typically, the transmission region during a normal period corresponds to the entire picture. The transmission control section 17 also monitors whether an event to trigger a recovery occurs. An event to trigger a recovery includes, for example, a loss or an absence of encoded information at an apparatus which is to decode a video. A loss of necessary encoded information may occur as a result of a packet loss due to convergence in a transmission path or a temporary degradation in transmission quality. An absence of necessary encoded information may occur, for example, in a case where a cut-in reproduction of the video content is requested (no information of reference pictures preceding the starting time point of reproduction has not been transmitted). The transmission control section 17, upon detection of such an event, shrinks the transmission region to a transmission region for recovery, which is preconfigured by the tile setting section 12, and restricts the transmission such that only an encoded stream corresponding to the tiles within the transmission region for recovery is transmitted. During recovery, the transmission region equals the transmission region for recovery. Upon completion of the recovery, the transmission region is reset to the entire picture and the transmission region for recovery is reset to a partial region.

The rate control section 18 generates a rate control signal in accordance with a desired transmission rate determined by the transmission control section 17, and outputs the generated rate control signal to the quantization section 15. For example, when the desired transmission rate is relatively low, the rate control section 18 generates a rate control signal for lowering the bit rate of the quantized data. Also, for example, when the desired transmission rate is relatively high, the rate control section 18 generates a rate control signal for increasing the bit rate of the quantized data.

The inverse quantization section 21, the inverse orthogonal transform section 22, and the addition section 23 constitute a local decoder. The local decoder takes a role of reconstructing an original image from encoded data.

The inverse quantization section 21 performs de-quantization on the quantized data by the same quantization step as used by the quantization section 15 to thereby restore the transform coefficient data. Then, the inverse quantization section 21 outputs the restored transform coefficient data to the inverse orthogonal transform section 22.

The inverse orthogonal transform section 22 performs an inverse orthogonal transform process on the transform coefficient data input from the inverse quantization section 21 to thereby restore the prediction error data. Then, the inverse orthogonal transform section 22 outputs the restored prediction error data to the addition section 23.

The addition section 23 adds the restored prediction error data input from the inverse orthogonal transform section 22 to the predicted image data generated by the intra-prediction section 30 or the inter-prediction section 40 to thereby generate decoded image data (reconstructed image). Then, the addition section 23 outputs the generated decoded image data to the deblocking filter 24 and the frame memory 26.

The deblocking filter 24 and the SAO filter 25 are both in-loop filters for improving image quality of reconstructed images. The deblocking filter 24 removes block distortions by filtering the decoded image data input from the addition section 23, and outputs the filtered decoded image data to the SAO filter 25. The SAO filter 25 removes noises by applying an edge offset process or a band offset process to the decoded image data input from the deblocking filter 24, and outputs the processed decoded image data to the frame memory 26.

The frame memory 26 stores the un-filtered decoded image data input from the addition section 23 and the decoded image data to which in-loop filtering has been applied input from the SAO filter 25 in a storage medium.

The switch 27 reads the un-filtered decoded image data to be used for the intra-prediction out from the frame memory 26 and supplies the read decoded image data as reference image data to the intra-prediction section 30. Further, the switch 27 reads the filtered decoded image data to be used for the inter-prediction out from the frame memory 26 and supplies the read decoded image data as reference image data to the inter-prediction section 40.

The mode setting section 28 sets a prediction coding mode for each CTU on the basis of comparison between costs input from the intra-prediction section 30 and the inter-prediction section 40. However, the mode setting section 28 sets prediction coding modes to be the intra-prediction mode for all CTUs within a tile that is set to be an intra tile. The mode setting section 28 outputs, for a CTU for which the intra-prediction mode is set, predicted image data generated by the intra-prediction section 30 to the subtraction section 13 and information regarding intra-prediction to the lossless encoding section 16. Further, the mode setting section 28 outputs, for a CTU for which an inter-prediction mode is set, predicted image data generated by the inter-prediction section 40 to the subtraction section 13 and outputs information regarding inter-prediction to the lossless encoding section 16.

The intra-prediction section 30 performs an intra-prediction process for each of one or more PUs configured in CTUs within each tile on the basis of original image data and decoded image data. For example, the intra-prediction section 30 evaluates a cost based on a prediction error and an amount of code to be generated for each of prediction mode candidates within a search range. Then, the intra-prediction section 30 selects a prediction mode which minimizes the cost as an optimum prediction mode. In addition, the intra-prediction section 30 generates a predicted image data in accordance with the selected optimum prediction mode. Then, the intra-prediction section 30 outputs information regarding intra-prediction including prediction mode information indicating the optimum prediction mode, a corresponding cost, and the predicted image data to the mode setting section 28.

The inter-prediction section 40 performs an inter-prediction process (motion compensation) for each of one or more PUs configured in CTUs within each tile on the basis of the original image data and the decoded image data. For example, the inter-prediction section 40 evaluates a cost based on a prediction error and an amount of code to be generated for each of prediction mode candidates within a search range. In searching a motion vector for motion compensation, for a target tile of which out-of-tile reference prohibition flag is set to True, the inter-prediction section 40 only includes, in the search range, tiles at the same positon as the target tile over all of reference pictures. Then, the inter-prediction section 40 selects a prediction mode which minimizes the cost as an optimum prediction mode. In addition, the inter-prediction section 40 generates predicted image data in accordance with the selected optimum prediction mode. Then, the inter-prediction section 40 outputs information regarding inter-prediction, a corresponding cost, and the predicted image data to the mode setting section 28.

[3-2. Setting Transmission Region for Recovery]

In this item, the transmission region for recovery set by the tile setting section 12 will be described in more detail.

(1) Basic Idea

FIG. 5 is an illustrative diagram for describing a basic idea of a transmission region for recovery. In FIG. 5, a time axis is indicated along the horizontal direction with some timings plotted from time $t_1$ to time $t_{10}$. A picture to be encoded and a picture to be transmitted to an decoding apparatus at each timing are also shown below the time axis. Herein, it is assumed that each picture is partitioned into sixteen tiles with four rows and four columns. At time $t_1$, a normal transmission is going on and the transmission region R1 corresponds to the entire picture. The transmission region for recovery R2 set by the tile setting section 12 occupies the four tiles at the center of the picture with two rows and two columns. The tiles outside the transmission region for recovery R2 are also transmitted at this time point.

At time $t_2$, the transmission region is not changed but a piece of encoded information is lost as a result of transmission and some of the tiles become non-decodable. At time $t_3$, the transmission control section 17 detects such a loss, for example, on the basis of signaling from the decoding apparatus 60 (or any node in the network 5) and determines which tile has become non-decodable. At time $t_4$, the transmission control section 17 shrinks the transmission region R1 to fit with the transmission region for recovery R2 resulting in that the only encoded stream corresponding to the four tiles within the transmission region for recovery R2 is transmitted. Such restriction on transmission is also applied at time $t_5$ and, during this interval, normal decoding/reproduction of an image of the transmission region for recovery R2 is recovered through encoding, transmission and decoding of the intra tiles.

In a later period during recovery including time $t_6$, the tile setting section 12 progressively extend the transmission region for recovery R2 (equals transmission region R1) tile by tile. A tile corresponding to the newly extended part is encoded as an intra tile. In a case where any tile outside the transmission region for recovery R2 has become non-decodable, normal decoding/reproduction of an image of the tile which has once become non-decodable will be recovered through such progressive extension of the region. After the normal decoding/reproduction of an image of all tiles is completed, at time $t_{10}$, the transmission region for recovery R2 is reset. Herein, the transmission region for recovery R2 may be set to the same region as that at time $t_1$ or may be different. The transmission region R1 corresponds to the entire picture.

(2) Determination of Transmission Region for Recovery

Figure 6A:
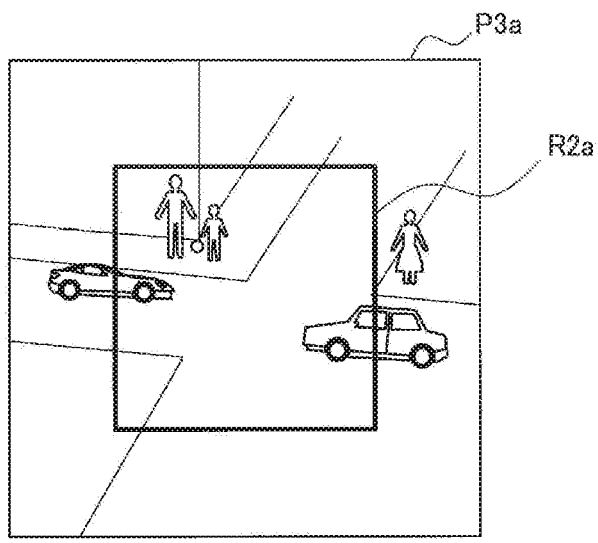
FIG. 6A is an illustrative diagram for describing the first example of a technique to determine a transmission region for recovery.

FIG. 6A is an illustrative diagram for describing the first example of a technique to determine a transmission region for recovery. In the example of FIG. 6A, the picture P3a is a frame included in a video captured by a security camera. The picture P3a shows a corner of a monitored town street. The transmission region for recovery R2a is a rectangular region at the center of the picture P3 for which a stable monitoring is desired. For example, an operator user to set up the security camera defines such a transmission region for recovery. Region information defining the transmission region for recovery may be created in advance and stored in a memory of the encoding apparatus 10. The tile setting section 12 may read such region information out from the memory and set the transmission region for recovery R2a for the picture P3a (and a succeeding set of pictures).

Figure 6B:
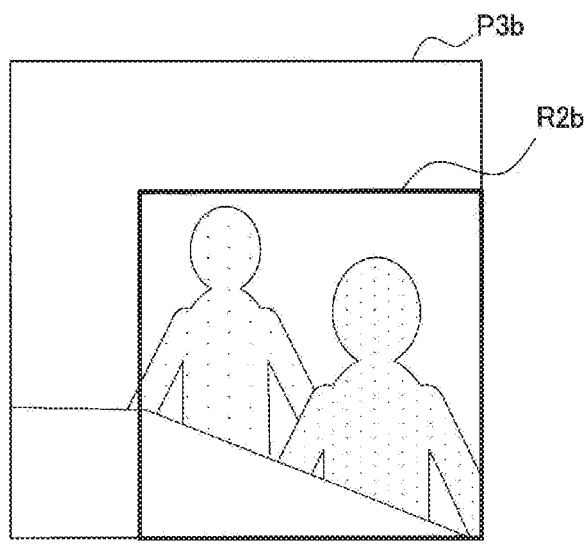
FIG. 6B is an illustrative diagram for describing the second example of a technique to determine a transmission region for recovery.

FIG. 6B is an illustrative diagram for describing the second example of a technique to determine a transmission region for recovery. In the example of FIG. 6B, the picture P3b is a frame included in a video transmitted through a video conference system. The tile setting section 12 may recognize a region where participants of the conference are mainly seen (such as regions of human bodies or faces) by, for example, analyzing the video content and set the recognized region as the transmission region for recovery R2b for the picture P3b.

As the examples of FIGS. 6A and 6B, the transmission region for recovery may be, but not limited to, a region of interest which is important and to which an attention should be paid (a stable video should be provided) depending on a user-level or application-level requirement. Alternatively, the transmission region for recovery may be a fixed region which is defined independently of such a requirement. As another example, when it is used for distributing a sports video, the transmission region for recovery may be determined to be a region where the field of the sports game can be seen. Moreover, when it is used for distributing a concert video, the transmission region for recovery may be determined to be a region where the artist or the stage can be seen.

Figure 6C:
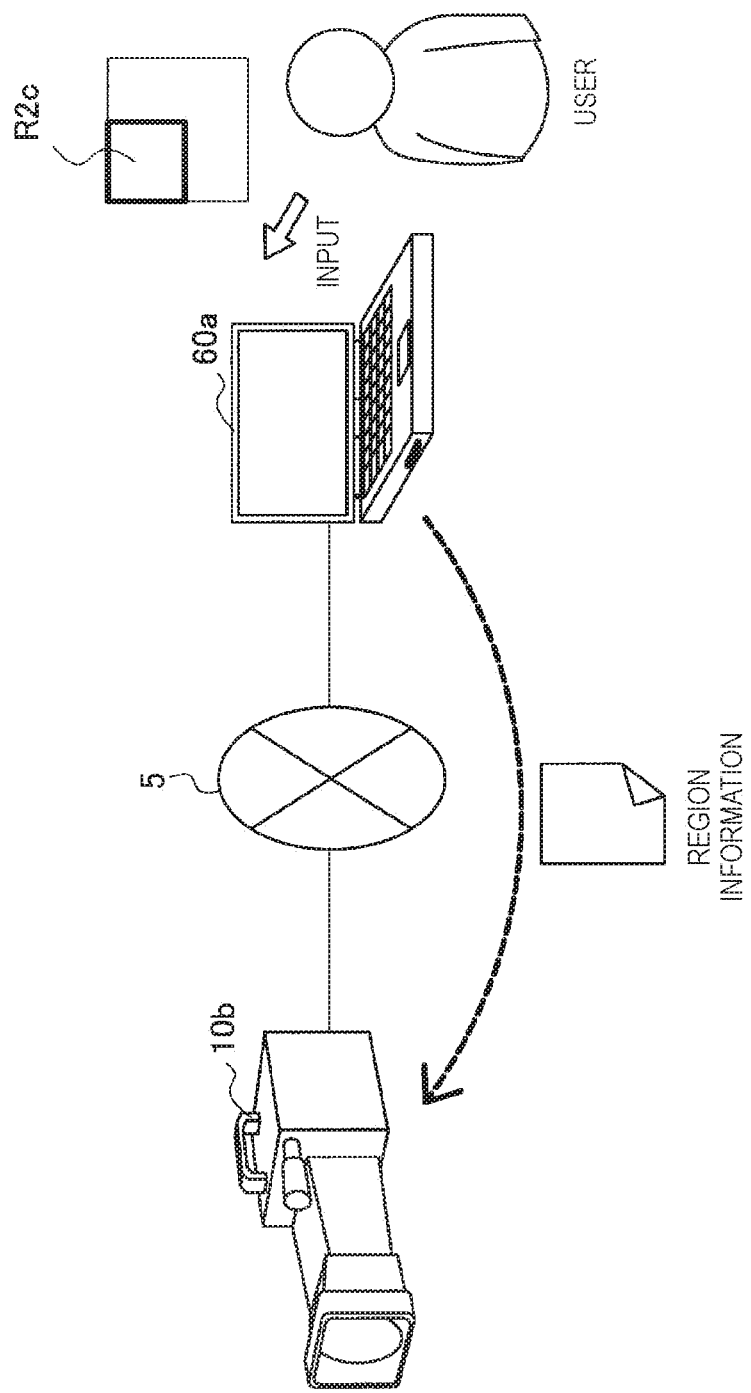
FIG. 6C is an illustrative diagram for describing the third example of a technique to determine a transmission region for recovery.

FIG. 6C is an illustrative diagram for describing the third example of a technique to determine a transmission region for recovery. In the example of FIG. 6C, a user who views the video decoded by the decoding apparatus 60a and displayed on a display screen determines the transmission region for recovery R2c to be a partial region for which a stable video reproduction is desired. The decoding apparatus 60a creates region information regarding the transmission region for recovery R2c on the basis of a user input acquired via a user interface and provides the encoding apparatus 10b, which is the transmission source of the video, with the created region information. The tile setting section 12 of the encoding apparatus 10b sets, for images, the transmission region for recovery R2c on the basis of the region information received in such a way from the decoding apparatus 60a.

[3-3. Recovery upon Packet Loss]

In this item, the way to carry out recovery of normal decoding/reproduction of a video content through shrinking a transmission region to a transmission region for recovery and tile-based distributed refresh will be described in more detail. In the embodiment, a recovery period may be divided into a period for in-region recovery that may, for example, include time $t_4$ and time $t_5$ in FIG. 5 and a period for extending the transmission region that may, for example, include time $t_6$ in FIGS. 6A and 6B. However, the in-region recovery may not be carried out in a case where non-decodable tiles exist only outside the transmission region for recovery.

(1) In-region Recovery

FIG. 7 is an illustrative diagram for describing an example of an in-region recovery. In the example of the FIG. 7, the transmission region for recovery R3 occupies nine tiles at the upper right portion of the picture with three rows and three columns. Before a loss of encoded information is detected, out-of-tile reference from the tiles within the transmission region for recovery R3 is set to be prohibited (see upper left of the figure). Out-of-tile reference from the tiles outside the transmission region for recovery R3 may be allowed or prohibited. Then, if, for example, the tile T15 included in the transmission region for recovery R3 becomes non-decodable due to loss of encoded information (see lower left of the figure), the transmission control section 17 shrinks the transmission region to fit with the transmission region for recovery R3 and the lossless encoding section 16 encodes the tile T15 as an intra tile (see upper right of the figure). The encoded stream corresponding to the tile T15 which is an intra tile is transmitted to the decoding side during a time when a restriction is imposed on the transmission by the transmission control section 17.

As mentioned previously, in a case where the tile T15 is encoded as an intra tile, the amount of codes generated for the tile T15 will be increased compared to the amount otherwise generated (that is, in the case where an inter-prediction is allowed). However, the intra tile is confined to a portion of a picture. Moreover, because the transmission region is shrunk to the transmission region for recovery R3 and no encoded stream corresponding to the tiles outside that region is transmitted during the recovery period, a bandwidth which can be consumed for an encoded stream corresponding to the intra tile is temporarily augmented. Through such an approach, the risk that a transmission delay or another decoding failure occurs during the recovery period will be reduced. It will also become not necessary to perform undesirable processing that may degrade the image quality for the sake of avoiding bandwidth overflow (for example, undue quantization etc.). As the out-of-tile reference from each of tiles within the transmission region for recovery R3 is preliminarily set to be prohibited, the impact of the loss of encoded information will be localized only to the tile of which information is directly lost. That is, in the example of FIG. 7, the tile T15, which has become non-decodable, will be recovered through being encoded/decoded as an intra tile while the other tiles within the transmission region for recovery R3 (for example, the tiles T12, T13 and T14) are kept ready for inter-prediction without being affected by the loss. Therefore, there is no need to encode/decode these tiles as intra tiles during recovery. Since no encoded stream corresponding to tiles for which out-of-tile reference is allowed is transmitted during recovery, no reference error in inter-frame prediction might be caused with all transmitted tiles.

It should be noted that, although only a single tile T15 is set to be an intra tile in the example of FIG. 7, the number of tiles to be set as intra tiles varies depending on a degree of impact of the loss of encoded information. In a case where a plurality of tile are impacted, the tile setting section 12 may determine how many tiles per a picture are to be set as intra tiles depending on an available transmission bandwidth.

(2) Extending Transmission Region—First Example

FIG. 8 is an illustrative diagram for describing the first example of extending a transmission region. In FIG. 8, exemplary pictures transmitted to the decoding side subsequent to the in-region recovery described using FIG. 7 are sequentially illustrated. After recovery of the tile T15 through encoding/decoding as an intra tile, the tiles within the transmission region for recovery R3 are all decodable. After that, the tile setting section 12 progressively extend the transmission region for recovery R3 tile by tile during the period of extending transmission region. With reference to the example of FIG. 8, the transmission region for recovery R3 is extended by one tile per a picture (T21->T22->T23 ...). In the meantime, the encoding section 16 encodes tiles corresponding to the newly extended part of the transmission region for recovery R3 as intra tiles. Also in this case, because the intra tiles are confined to a portion of a picture, a peak of an amount of codes is suppressed. Moreover, because no encoded stream corresponding to the tiles for which out-of-tile reference is allowed is transmitted, it is possible to enlarge decodable region while avoiding a reference error in inter-frame prediction newly caused with any of transmitted tiles. In a case where any tile outside the transmission region for recovery R3 becomes non-decodable due to a loss of encoded information, that tile will be recovered to be decodable during the period of extending transmission region through this progressive extension of the transmission region for recovery R3.

After all of the tiles become decodable through the above-described progressive extension of the transmission region for recovery, the tile setting section 12 resets the transmission region for recovery to be a partial region. An example of this resetting is shown in FIG. 5. When the transmission region for recovery is reset, the recovery period ends and a normal transmission is resumed (3) Extending Transmission Region—Second Example FIG. 9 is an illustrative diagram for describing the second example of extending a transmission region. In FIG. 9, exemplary pictures transmitted to the decoding side subsequent to the in-region recovery described using FIG. 7 are sequentially illustrated similarly to FIG. 8. In the second example, the tile setting section 12 extends the transmission region for recovery at a timing dynamically determined on the basis of availability of the transmission bandwidth during a time when a restriction is imposed on the transmission by the transmission control section 17. In the example of FIG. 9, the tile T21 is incorporated into the transmission region for recovery R3 and the transmission region for recovery R3 is not extended at the next picture because there is little available transmission bandwidth (for example, a significant change in an image content of a region of interest results in large bandwidth consumption for the region of interest). After that, at a timing when a sufficient transmission bandwidth is available, the transmission region for recovery R3 is extended progressively in an order such as the tile T22 and then the tile T23. According to this embodiment, since the prohibition of out-of-tile reference prevents an error from propagating tile to tile during recovery, intra tiles can be added safely at any timing determined dynamically in such a way in a situation where there is a limited network bandwidth. The video within the transmission region for recovery that has been initially set up will be decoded/reproduced continuously and stably even during recovery.

As understood from the examples shown in FIGS. 8 and 9, the transmission region may temporarily take a non-rectangular form during the period of extending transmission region. If the transmission region (which equals the transmission region for recovery) is non-rectangular in such a way, the tile setting section 12 may set each tile to be displayed or not to be displayed such that an image decoded by the decoding apparatus is displayed rectangularly. For example, the displayed image can be shaped into rectangular, without any additional implementation at the decoder side, by setting the flag display_tile_set_flag[i] described using the Table 1 for the tiles outside the rectangular portion to be False (="0") and setting the same flag for the other tiles to be True.

[3-4. Recovery Triggered by Other Events]In this embodiment, an example of an event that triggers a recovery is an above-described loss of packets. Another example of an event that triggers a recovery may include a cut-in reproduction of video content and a scene change.

(1) Cut-In Reproduction

FIG. 10 is an illustrative diagram for describing an example of recovery at a cut-in reproduction. With reference to FIG. 10, a time axis similar to that of FIG. 5 is indicated again with some timings plotted from time $t_2$ to time $t_{10}$. While normal transmissions have been carried out in the example of FIG. 5 from time $t_1$ to time $t_2$, it should be noted here that an encoded stream is not transmitted to the decoding apparatus 60 although a video is encoded by the encoding apparatus 10. Then, the transmission control section 17, at time $t_3$, receives a request for cut-in reproduction starting from the picture P4 from a user who wants to view the video content. At this time point, encoded information about reference frames that would be referred to for decoding the picture P4 is absent at the decoding side. At time $t_4$, the transmission control section 17 shrinks the transmission region R1 to fit with the transmission region for recovery R4 and only the encoded stream corresponding to the two tiles within the transmission region for recovery R4 is transmitted. The tile setting section 12 sets the tiles within the transmission region for recovery R4 to be intra tiles and those tiles are thus decodable irrespective of the cut-in reproduction. Moreover, since shrinking the transmission region allows more bandwidth to be allocated for an encoded stream derived from intra tiles, the risk that a transmission delay or decoding failure occurs during recovery triggered by starting the cut-in reproduction will be reduced.

From time $t_5$ through time $t_8$, the tile setting section 12 progressively extends the transmission region for recovery R4 (which equals the transmission region R1) tile by tile (in the example of FIG. 10, per two tiles basis). Tiles corresponding to the newly extended part are encoded as intra tiles. At time $t_{10}$, the tile setting section 12 resets the transmission region for recovery R4 because all tiles within a picture have become decodable. The transmission region R1 corresponds to the entire picture. Through such a progressive extension of the regions, a normal decoding/reproduction of images of all tiles can be started from a middle of a video without tightening transmission bandwidth. The case of the cut-in reproduction is different from the case of the packet loss in that not a subset of tiles but all of tiles within a picture may once fall into a state where they would be non-decodable. Thus, in an exemplary alteration, the tile setting section 12 may set, for an image, a first transmission region for recovery for the purpose of recovery from a packet loss and a second transmission region for recovery for the purpose of recovery upon cut-in reproduction. The second transmission region for recovery in this case is smaller than the first transmission region for recovery. The transmission control section 17 restricts transmissions such that only an encoded stream corresponding to the tiles within the first transmission region for recovery is transmitted when a packet transmitted to the decoding apparatus 60 has been lost. A subset of tiles that has become non-decodable due to the loss of encoded information among the tiles within the first transmission region for recovery is encoded as intra tiles during recovery. The transmission control section 17 also restricts transmissions such that only an encoded stream corresponding to the tiles within the second transmission region for recovery is transmitted when a cut-in reproduction of the video has been requested. All of the tiles within the second transmission region for recovery would be non-decodable due to absence of encoded information and each of those tiles will be at least once encoded as an intra tile during recovery. By using such a plurality of transmission regions for recovery concurrently, it will be possible to flexibly control an amount of codes depending on a type of event that triggers a recovery and the risk that a transmission delay or another decoding failure occurs during recovery can even more strongly be reduced.

(2) Scene Change

Figure 11:
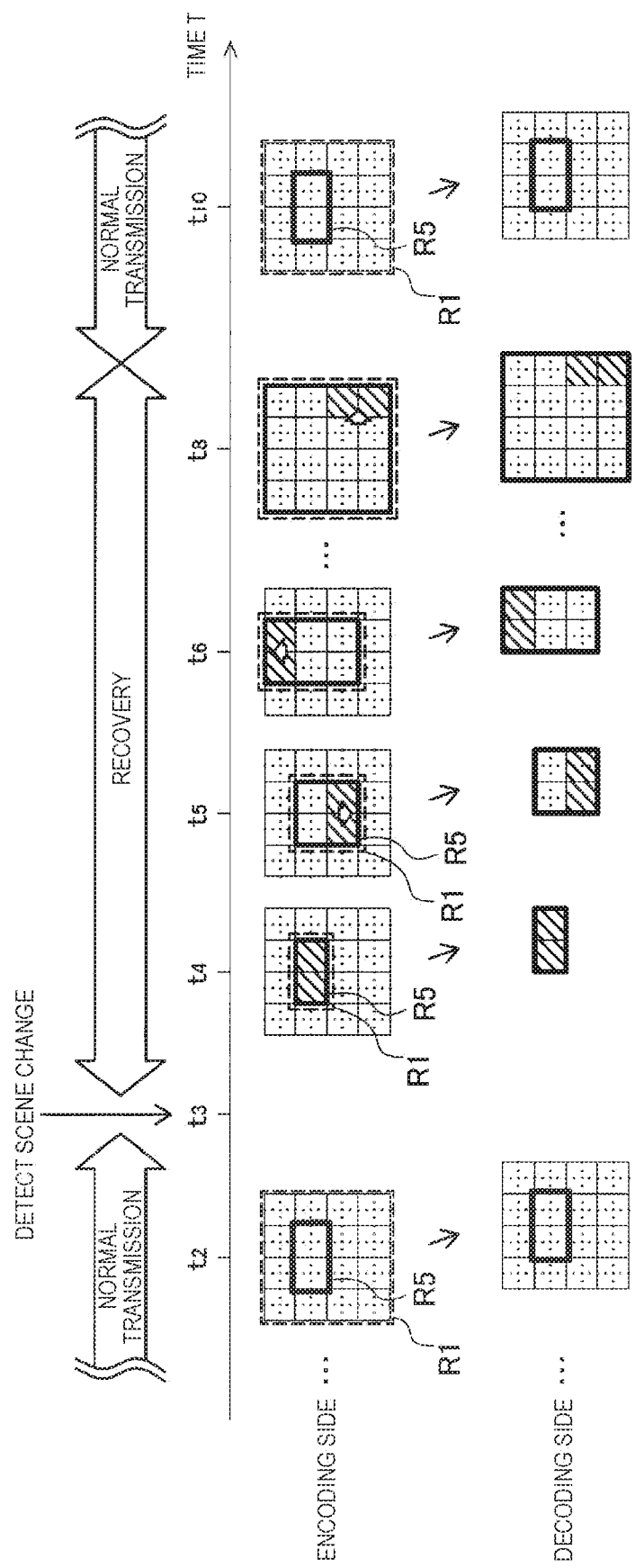
FIG. 11 is an illustrative diagram for describing an example of recovery at a scene change.

FIG. 11 is an illustrative diagram for describing an example of recovery at a scene change. In the example of FIG. 11, a normal transmission is carried out at the time point of time $t_2$. The transmission control section 17 thereafter determines that a scene change has occurred on the basis of a dynamic analysis on the video at time $t_3$. In a case where a scene change has occurred, no encoding gain can be obtained from inter-frame prediction at a subsequent picture and it is thus desirable to at least once encode all of the tiles within the picture as intra tiles. Hence, at time $t_4$, the transmission control section 17 shrinks the transmission region R1 to fit with the transmission region for recovery R5 and only the encoded stream corresponding to the two tiles within the transmission region for recovery R5 is transmitted. The tile setting section 12 sets the tiles within the transmission region for recovery R5 to be intra tiles. Since shrinking the transmission region allows more bandwidth to be allocated for an encoded stream derived from intra tiles, the risk that a transmission delay or decoding failure occurs during recovery triggered by the scene change will be reduced.

From time $t_5$ through time $t_8$, the tile setting section 12 progressively extends the transmission region for recovery R5 (which equals the transmission region R1) tile by tile. Tiles corresponding to the newly extended part are encoded as intra tiles. At time $t_{10}$, the tile setting section 12 resets the transmission region for recovery R5 because all tiles within a picture have become decodable. The transmission region R1 corresponds to the entire picture.

4. FLOW OF PROCESS DURING ENCODING (1) Transmission Control Process

Figure 12:
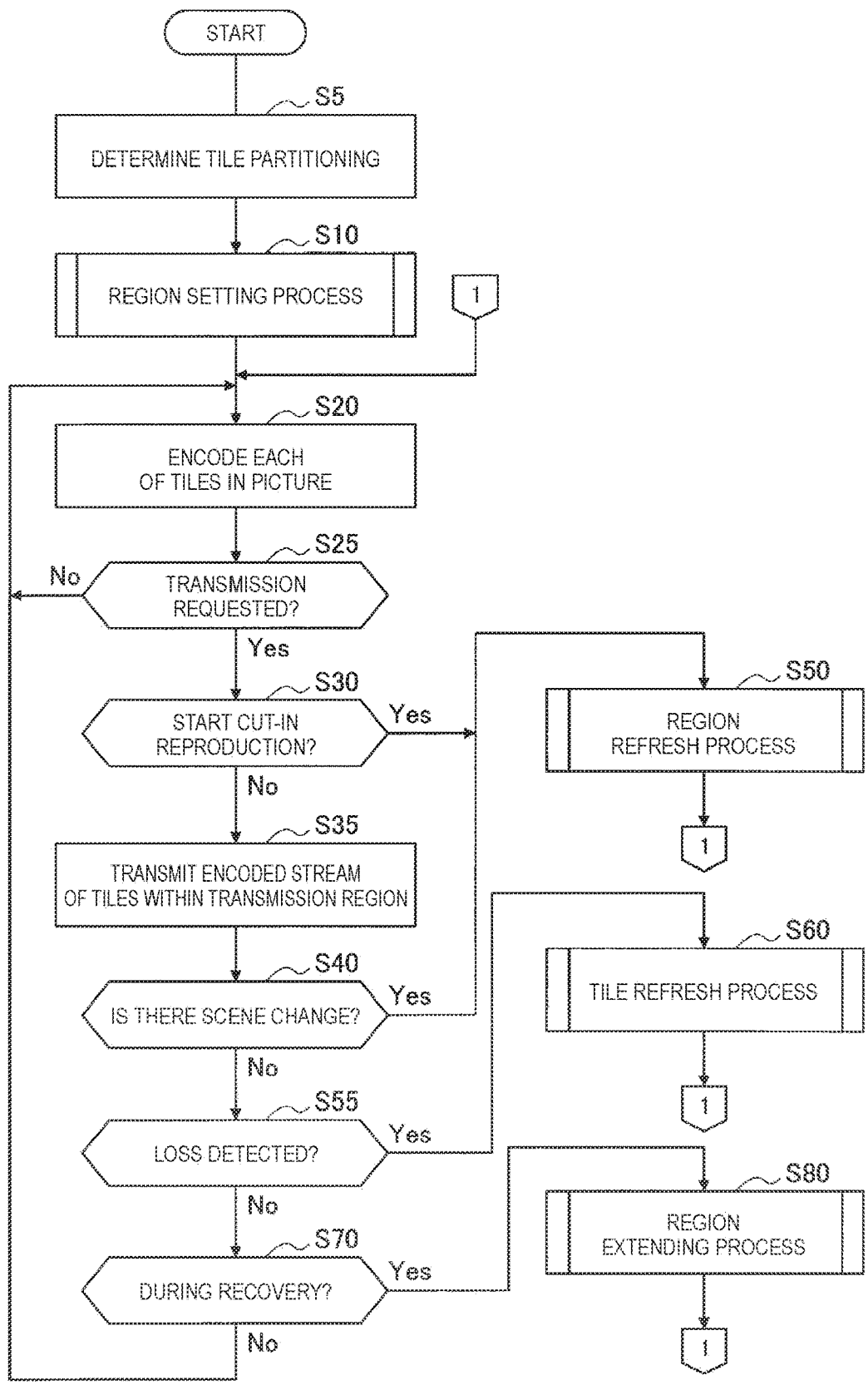
FIG. 12 is a flowchart illustrating an example of a flow of a transmission control process at an encoding side according to an embodiment.

FIG. 12 is a flowchart illustrating an example of a flow of a transmission control process at an encoding side according to an embodiment. Note that process steps performed by the encoding apparatus 10 that are not directly related to the subject matter of the technology according to the present disclosure are omitted from illustrations for the sake of clarity of explanation.

First, the tile setting section 12 determines how to partition an image into a plurality of tiles, that is, determines a mode of tile partitioning (step S5). Next, the tile setting section 12 sets a transmission region for recovery, which is a partial region including one or more of the plurality of tiles, for the image by performing region setting process as described in detail later (step S10). FIG. 12 shows an example where a transmission region for recovery is set for an image after tile partitioning is determined. However, the example is not a limitation and it is also possible that a tile partitioning is determined after a region information indicating a desired transmission region for recovery is obtained such that the determined tile partitioning fits with the desired region.

Next, the lossless encoding section 16 encodes quantized data of each of tiles within a picture thereby generating an encoded stream and also inserts encoded parameters at least including tile information into the encoded stream (step S20). In a case where transmission of the encoded stream has not yet been requested from the decoding apparatus 60, no encoded stream is transmitted. In a case where a transmission has already been started or a new request for transmission is received (step S25), the flowchart proceeds to step S30.

At step S30, the transmission control section 17 determines whether starting a cut-in reproduction is requested or not (step S30). In a case where starting a cut-in reproduction is requested, the flowchart proceeds to the region refresh process at step S50 as described in detail later. In a case where starting a cut-in reproduction is not requested, the transmission control section 17 transmits an encoded stream corresponding to one or more tiles within the transmission region to the decoding apparatus 60 (step S35). Next, the transmission control section 17 determines whether a scene change has occurred in the following picture to be encoded, for example, on the basis of an analysis (step S40). Also in a case where it is determined that a scene change has occurred, the flowchart proceeds to the region refresh process. In a case where no scene change has occurred, the transmission control section 17 monitors occurrence of a packet loss (step S55). If a packet loss is detected here, the flowchart proceeds to the tile refresh process at step S60 as described in detail later. If no packet loss is detected and a recovery is not currently going on, the flowchart goes back to step S20 and the encoding and transmission on a per-tile basis will be repeated for subsequent pictures. Meanwhile, if a recovery is currently going on, the flowchart proceeds to the region extending process at step S80 as described in detail later.

After the region refresh process (step S50), the tile refresh process (step S60) or the region extending process (step S80) is completed, the flowchart goes back to step S20 and the encoding and transmission on a per-tile basis will be repeated for subsequent pictures. Although not indicated in FIG. 12, the steps S5 and S10 may be performed again if tile partitioning or the transmission region for recovery is to be changed.

(2) Region Setting Process

Figure 13A:
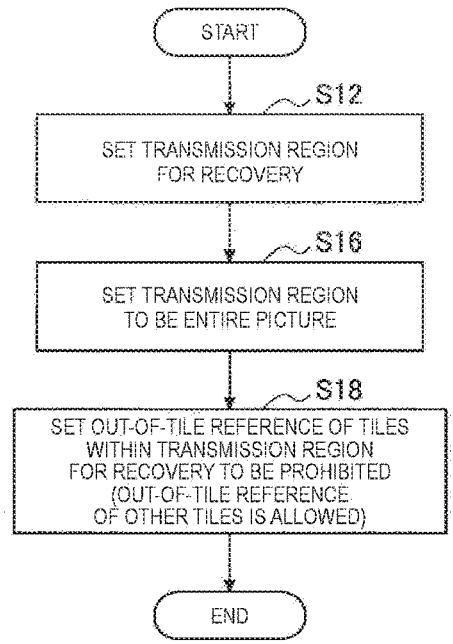
FIG. 13A is a flowchart illustrating the first example of a detailed flow of a region setting process mentioned in FIG. 12.

FIG. 13A is a flowchart illustrating the first example of a detailed flow of a region setting process mentioned in FIG. 12. In the first example, the tile setting section 12 first sets a transmission region for recovery on the basis of region information that is predefined or input by a user, or on the basis of an analysis on the video (step S12). Next, the tile setting section 12 sets a transmission region to be the entire picture (step S16). Next, the tile setting section 12 sets out-of-tile reference for motion compensation to be prohibited for all tiles within the transmission region for recovery (step S18). The tile setting section 12 may allow or prohibit out-of-tile reference for the tiles outside the transmission region for recovery.

Figure 13B:
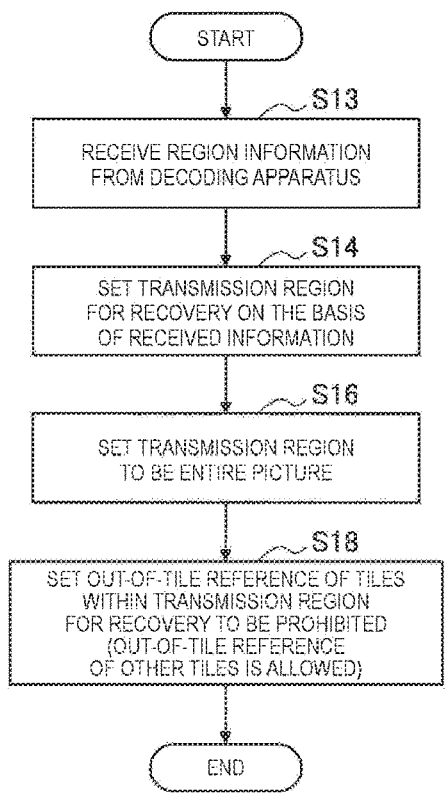
FIG. 13B is a flowchart illustrating the second example of a detailed flow of a region setting process mentioned in FIG. 12.

FIG. 13B is a flowchart illustrating the second example of a detailed flow of a region setting process mentioned in FIG. 12. In the second example, the transmission control section 17 first receives region information from the decoding apparatus 60 (step S13). Next, the tile setting section 12 sets a transmission region for recovery on the basis of the region information received by the transmission control section 17 (step S14). Next, the tile setting section 12 sets a transmission region to be the entire picture (step S16). Next, the tile setting section 12 sets out-of-tile reference for motion compensation to be prohibited for all tiles within the transmission region for recovery (step S18).

(3) Region Refresh Process

Figure 14:
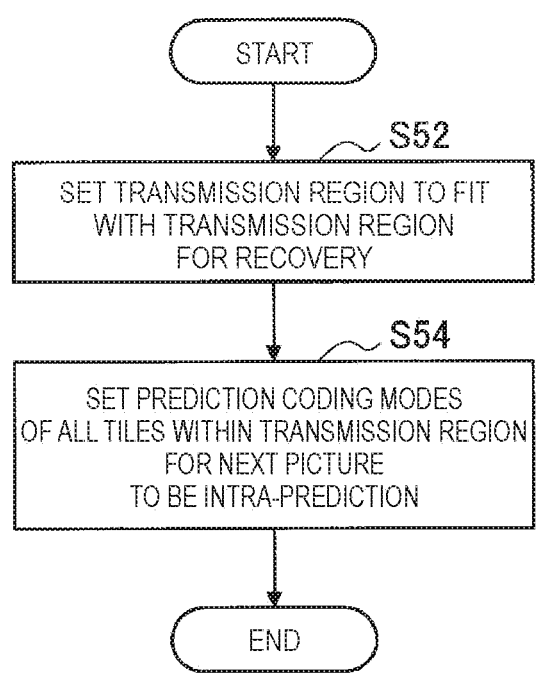
FIG. 14 is a flowchart illustrating an example of a detailed flow of a region refresh process mentioned in FIG. 12.

FIG. 14 is a flowchart illustrating an example of a detailed flow of a region refresh process mentioned in FIG. 12. In the region refresh process, the transmission control section 17 first sets (i.e. shrinks) the transmission region to fit with the transmission region for recovery (step S52). The tile setting section 12 sets the prediction coding modes of all tiles within the shrunk transmission region for next picture to be intra-prediction (step S54). All tiles within the transmission region which equals the transmission region for recovery will be encoded as intra tiles accordingly.

(4) Tile Refresh Process

Figure 15:
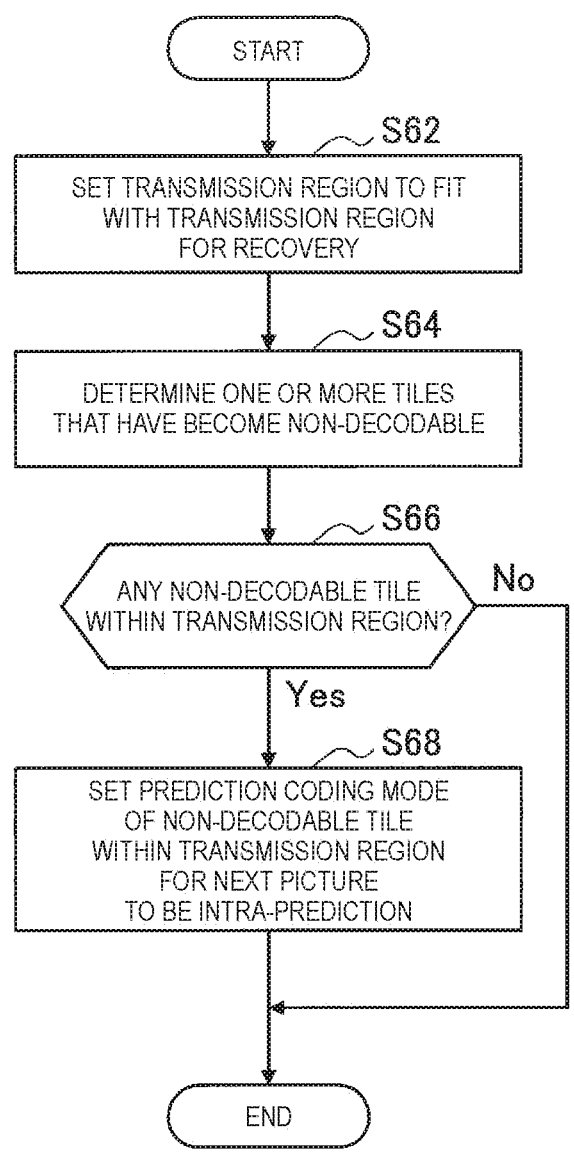
FIG. 15 is a flowchart illustrating an example of a detailed flow of a tile refresh process mentioned in FIG. 12.

FIG. 15 is a flowchart illustrating an example of a detailed flow of a tile refresh process mentioned in FIG. 12. In the tile refresh process, the transmission control section 17 first sets (i.e. shrinks) the transmission region to fit with the transmission region for recovery (step S62). The tile setting section 12 further determines which tile(s) have become non-decodable due to a packet loss (step S64). Then, the tile setting section 12 determines whether there is any non-decodable tile within the transmission region or not (step S66). In a case where there is a non-decodable tile within the transmission region, the tile setting section 12 sets the prediction coding mode of that non-decodable tile of next picture to be intra-prediction (step S68). The non-decodable tile will be encoded as an intra tile accordingly.

(5) Region Extending Process

Figure 16A:
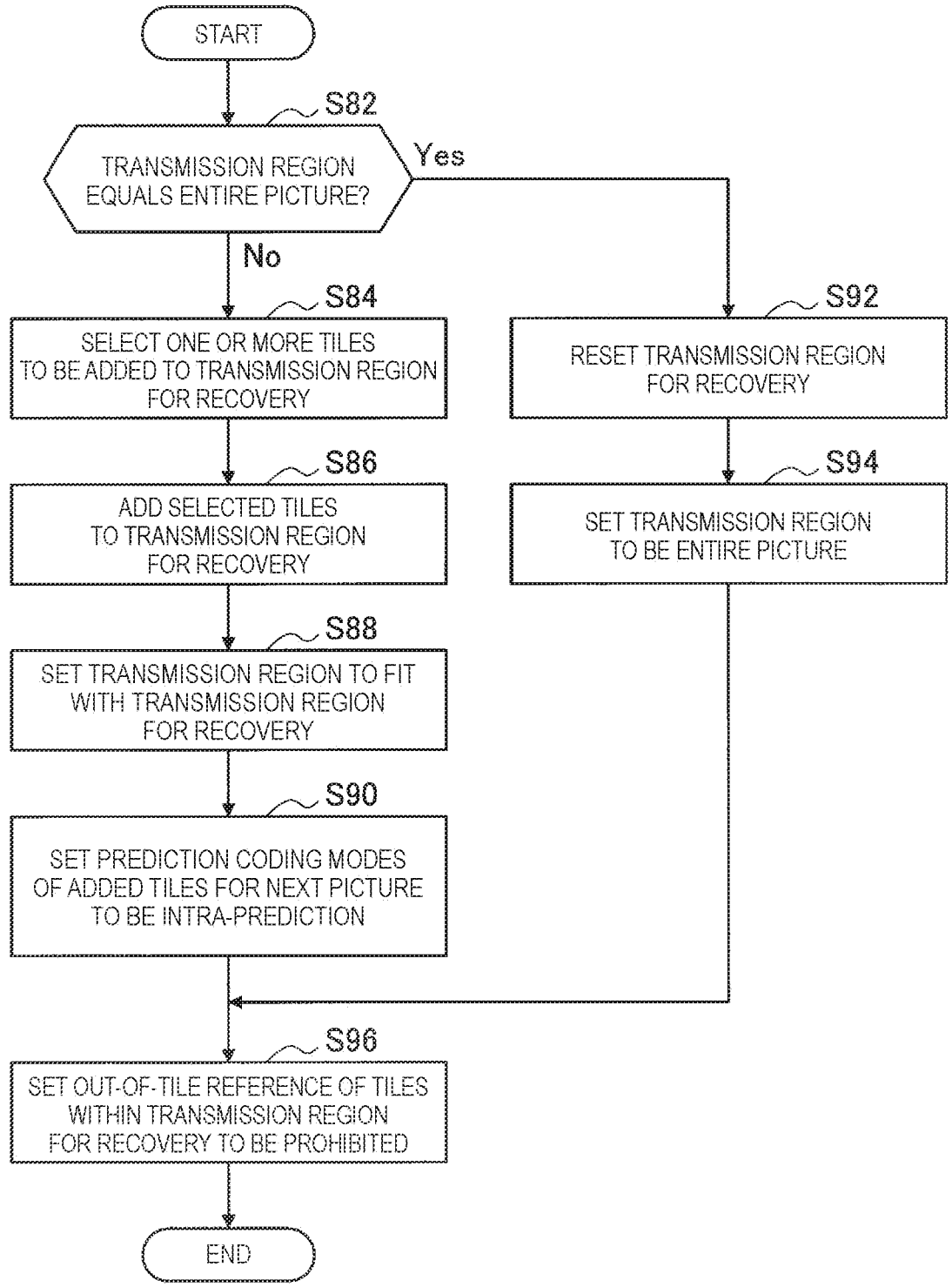
FIG. 16A is a flowchart illustrating the first example of a detailed flow of a region extending process mentioned in FIG. 12.

FIG. 16A is a flowchart illustrating the first example of a detailed flow of a region extending process mentioned in FIG. 12. In the first example, the tile setting section 12 first determines whether the transmission region equals the entire picture or not (step S82). As this determination is performed during recovery, the transmission region herein equals the transmission region for recovery. In a case where the transmission region has been extended to the entire picture through the region extending process for previous pictures, a positive result of the determination may be obtained at step S82. During recovery and the transmission region has not yet been extended to the entire picture, a negative result of the determination may be obtained.

If the transmission region does not equal the entire picture, the tile setting section 12 selects one or more tiles to be added to the transmission region for recovery (step S84). Next, the tile setting section 12 adds the selected tiles to the transmission region for recovery (step S86). The tile setting section 12 also sets the transmission region to fit with the extended transmission region for recovery (step S88). The tile setting section 12 also sets the prediction coding modes of the added tiles in the subsequent picture to be intra-prediction (step S90).

If the transmission region equals the entire picture, the tile setting section 12 resets the transmission region for recovery (step S92). The transmission region for recovery after the reset herein may be the same as or different than the transmission region for recovery set before the recovery period. The tile setting section 12 also sets the transmission region to be the entire picture (step S94).

Finally, the tile setting section 12 sets out-of-reference for tiles within the (extended or reset) transmission region for recovery to be prohibited (step S96).

Figure 16B:
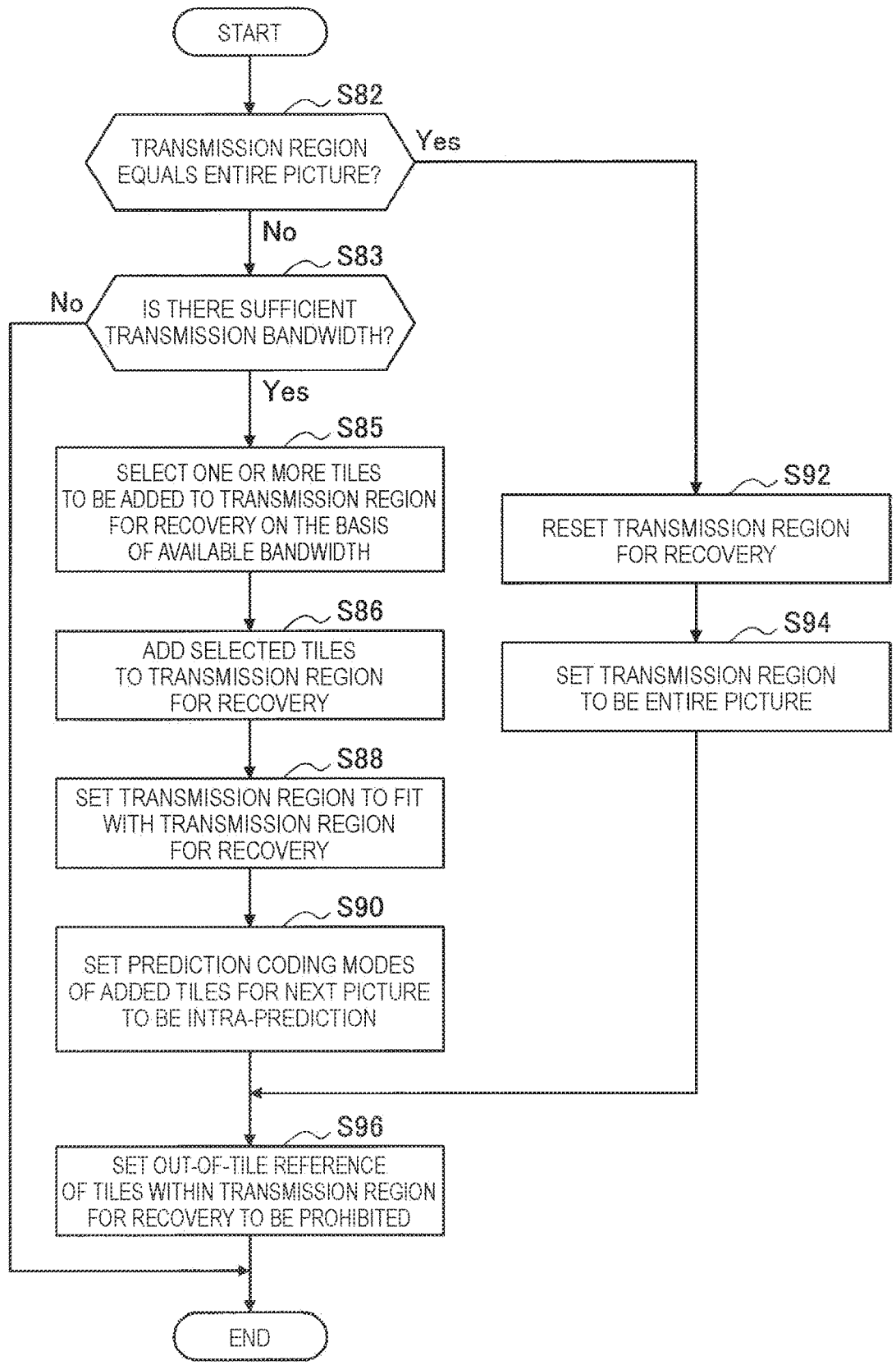
FIG. 16B is a flowchart illustrating the second example of a detailed flow of a region extending process mentioned in FIG. 12.

FIG. 16B is a flowchart illustrating the second example of a detailed flow of a region extending process mentioned in FIG. 12. Also in the second example, the tile setting section 12 first determines whether the transmission region equals the entire picture or not (step S82).

If the transmission region does not equal the entire picture, the tile setting section 12 determines an availability of transmission bandwidth (step S83). In a case where it is determined here that there does not remain sufficient transmission bandwidth to encode a new intra tile, the subsequent process steps S85 through S96 are skipped and the transmission region is not extended at this timing. In a case where sufficient transmission bandwidth to encode a new intra tile is available, the tile setting section 12 selects one or more tiles to be added to the transmission region for recovery on the basis of the available bandwidth (step S85). Next, the tile setting section 12 adds the selected tiles to the transmission region for recovery (step S86). The tile setting section 12 also sets the transmission region to fit with the extended transmission region for recovery (step S88). The tile setting section 12 also sets the prediction coding modes of the added tiles in the subsequent picture to be intra-prediction (step S90).

If the transmission region equals the entire picture, the tile setting section 12 resets the transmission region for recovery (step S92). The transmission region for recovery after the reset herein may be the same as or different than the transmission region for recovery set before the recovery period. The tile setting section 12 also sets the transmission region to be the entire picture (step S94).

Finally, when the transmission region for recovery is extended or reset, the tile setting section 12 sets out-of-reference for tiles within the transmission region for recovery to be prohibited (step S96).

5. CONFIGURATION OF DECODING APPARATUS

Figure 17:
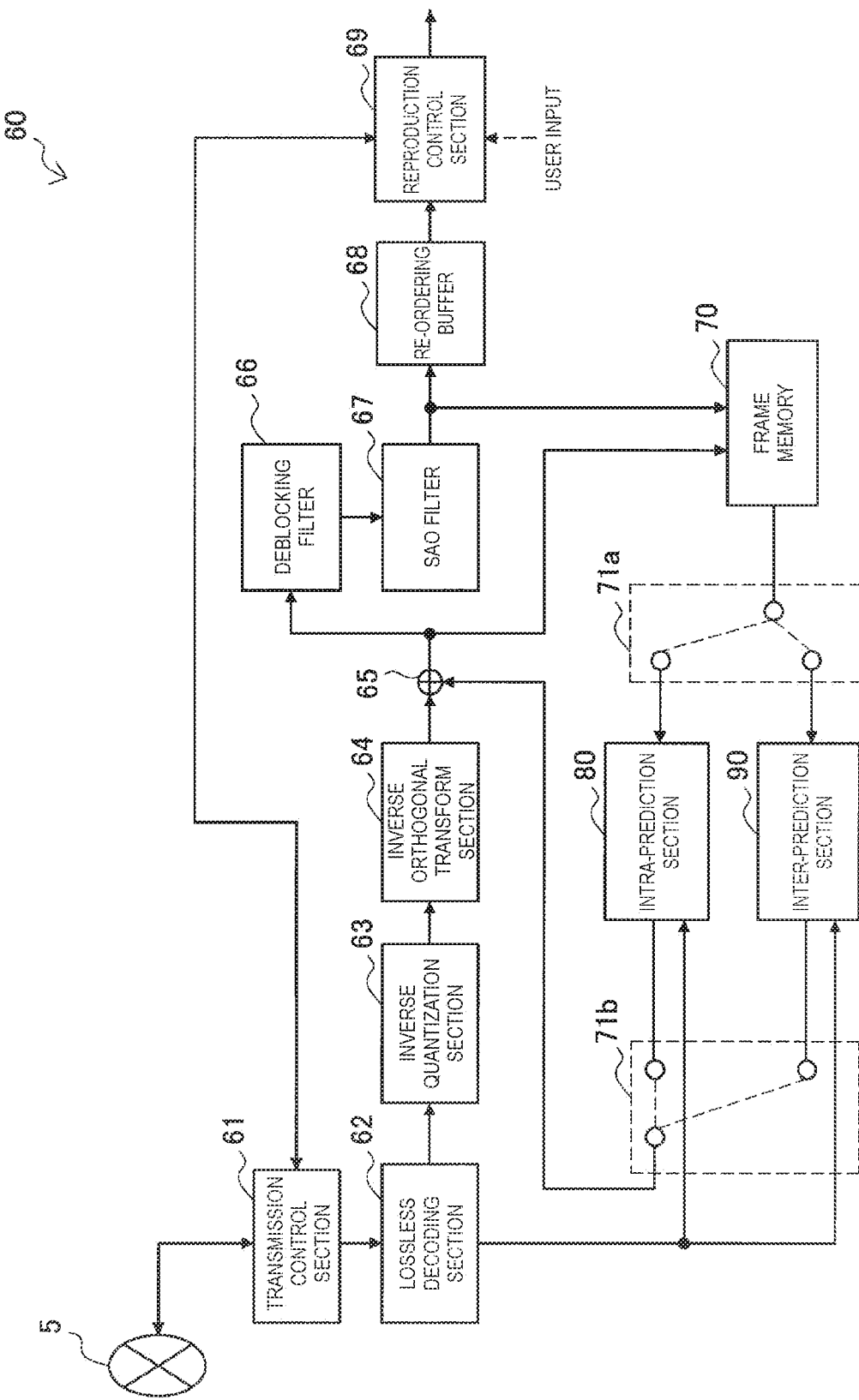
FIG. 17 is a block diagram illustrating an example of a configuration of a decoding apparatus.

FIG. 17 is a block diagram illustrating an example of a configuration of the decoding apparatus 60. With reference to FIG. 17, the decoding apparatus 60 includes a transmission control section 61, a lossless decoding section 62, an inverse quantization section 63, an inverse orthogonal transform section 64, an addition section 65, a deblocking filter 66, an SAO filter 67, a re-ordering buffer 68, a reproduction control section 69, a frame memory 70, selectors 71a and 71b, an intra-prediction section 80, and an inter-prediction section 90.

The transmission control section 61 controls reception of an encoded stream from the encoding apparatus 10 via the network 5. The transmission control section 61 sends a request for transmission of an encoded stream of a video content to the encoding apparatus 10, for example, in response to a user input through the reproduction control section 69. Then, when the transmission has been started, the transmission control section 61 sequentially receives the encoded stream from the encoding apparatus to output it to the lossless decoding section 62. The transmission control section 61 performs a kind of loss detection on the received packets such as sequence number verification or error detection, and in a case where it is detected that necessary encoded information has been lost due to a packet loss, the transmission control section 61 signals a message specifying the lost packet to the encoding apparatus 10. The transmission control section 61 may signal a message specifying a tile that has become non-decodable instead of the message specifying a packet. The encoded stream of the video contains a stream corresponding to all of the plurality of tiles within a picture in a normal period while it contains only a stream corresponding to tiles within a transmission region for recovery during recovery period after the above-described message is sent.

The transmission region for recovery may be determined at the encoding apparatus as described using FIGS. 6A and 6B or at the decoding apparatus 60 as described using FIG. 6C. In the latter case, for example, a user who views a video designates a partial region for which a stable reproduction of the video is desired via a user interface. The transmission control section 61 creates region information regarding the partial region designated by the user and provides the encoding apparatus 10, from which the video will be transmitted, with the created region information. Accordingly, the transmission region for recovery is set up on the basis of the region information at the encoding apparatus 10. As described above, out-of-tile reference for motion compensation is prohibited for the tiles within the transmission region for recovery.

The transmission request may be a normal request for reproduction from the beginning of the video content or may be a cut-in reproduction request for reproduction from a middle of the video content. In a case where the transmission control section 61 has sent the cut-in reproduction request for reproduction from a middle of the video content, the transmission initiated in response to that request will not be a normal transmission but a transmission for recovery and an encoded stream which only includes a stream corresponding to the tiles within the transmission region for recovery will be received until the recovery period ends.

The lossless decoding section 62, for the purpose of decoding the video content, decodes the encoded stream corresponding to each tile input from the transmission control section 61 to obtain quantized data of each tile. In addition, the lossless decoding section 62 decodes and obtains information inserted into the encoded stream. The information decoded by the lossless decoding section 62 can include, for example, tile information, information regarding intra-prediction, and information regarding inter-prediction. The lossless decoding section 62 outputs the quantized data to the inverse quantization section 63. In addition, the lossless decoding section 62 outputs the tile information to the reproduction control section 69, information regarding intra-prediction to the intra-prediction section 80 and the information regarding inter-prediction to the inter-prediction section 90.

The inverse quantization section 63 de-quantizes the quantized data input from the lossless decoding section 62 by the same quantization step as used in encoding to restore transform coefficient data. The inverse quantization section 63 outputs the restored transform coefficient data to the inverse orthogonal transform section 64.

The inverse orthogonal transform section 64 performs an inverse orthogonal transform on the transform coefficient data input from the inverse quantization section 63 in accordance with an orthogonal transform scheme used in the encoding, thereby generating prediction error data. The inverse orthogonal transform section 64 outputs the generated prediction error data to the addition section 65.

The addition section 65 generates decoded image data by adding the prediction error data input from the inverse orthogonal transform section 64 to predicted image data input from the selector 71b. Then, the addition section 65 outputs the generated decoded image data to the deblocking filter 66 and the frame memory 70. The deblocking filter 66 removes a block distortion by filtering the decoded image data input from the addition section 65 and outputs the filtered decoded image data to the SAO filter 67.

The SAO filter 67 removes noises by applying an edge offset process or a band offset process to the decoded image data input from the deblocking filter 66 and outputs the processed decoded image data to the re-ordering buffer 68 and the frame memory 70.

The re-ordering buffer 68 re-orders images input from the SAO filter 67, thereby generating a sequence of time-series image data. Then, the re-ordering buffer 68 outputs the generated image data to the reproduction control section 69.

The reproduction control section 69 controls reproduction of a video based on image data input from the re-ordering buffer 68. The reproduction control section 69, for example, converts the image data into image signals for video output and outputs the converted image signals to a display device (not shown).

The reproduction control section 69 may scale an image of the transmission region for recovery that has been partially decoded during recovery upon detection of a loss or an absence of encoded information such that the size of the image fits with a frame size, and then cause the display device to display it. In the example of FIG. 18, it can be seen in the right-hand side that an image of the transmission region for recovery R2a of the picture P5 is scaled up to fit with the frame size.

Figure 19:
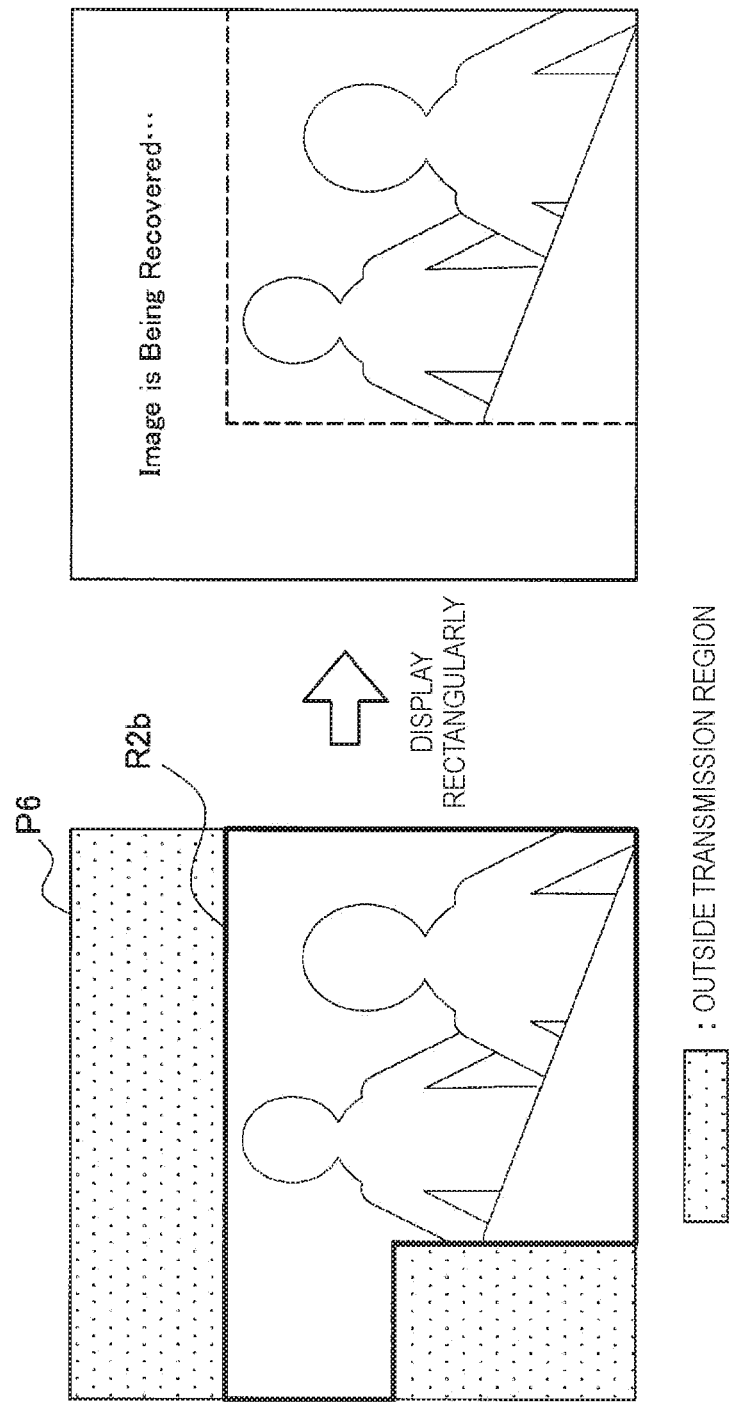
FIG. 19 is an illustrative diagram for describing an example of a rectangular display of a partial image.

Which tiles among the decoded tiles to display may be determined at the encoding side and signaled to the decoding side using the flag display_tile_set_flag[i] as described using the Table 1. Alternatively, the reproduction control section 69 may determine the shape of the decoded image and skip displaying a subset of tiles such that the displayed image will be rectangular. The reproduction control section 69 may further superpose, on the portion in which no video is to be displayed, a display object for notifying a user that a recovery is going on. In the example of FIG. 19, there is illustrated in the right-hand side a displayed image including a reproduced image of only rectangular portion within the picture P6 with a non-rectangular transmission region for recovery R2b as well as a message for notifying a user that a recovery is going on.

The frame memory 70 stores the unfiltered decoded image data input from the addition section 65 and the filtered decoded image data input from the SAO filter 67 in a storage medium.

The selector 71a switches an output destination of the image data from the frame memory 70 between the intra-prediction section 80 and the inter-prediction section 90 for each block in the image in accordance with mode information acquired by the lossless decoding section 62. In the case where an intra-prediction mode has been designated, for example, the selector 71a outputs the decoded image data that has not been filtered supplied from the frame memory 70 to the intra-prediction section 80 as reference image data. In addition, in the case where an inter-prediction mode has been designated, the selector 71a outputs the filtered decoded image data to the inter-prediction section 90 as reference image data.

The selector 71b switches an output source of the predicted image data to be supplied to the addition section 65 between the intra-prediction section 80 and the inter-prediction section 90 in accordance with mode information acquired by the lossless decoding section 62. In the case where the intra-prediction mode has been designated, for example, the selector 71b supplies the predicted image data output from the intra-prediction section 80 to the addition section 65. In addition, in the case where the inter-prediction mode has been designated, the selector 71b supplies the predicted image data output from the inter-prediction section 90 to the addition section 65.

A tile out of tiles within the transmission region for recovery, which has become non-decodable due to a loss or an absence of encoded information, is set to be an intra tile at least once during recovery and its corresponding encoded stream is received from the encoding apparatus 10. In the intra tile, no inter-frame prediction is performed and the predicted image data is generated by the intra-prediction section 80.

The intra-prediction section 80 performs an intra-prediction process on the basis of information regarding intra-prediction input from the lossless decoding section 62 and the reference image data from the frame memory 70, thereby generating the predicted image data. Then, the intra-prediction section 80 outputs the generated predicted image data to the selector 71b.

The inter-prediction section 90 performs an inter-prediction process on the basis of information regarding inter-prediction input from the lossless decoding section 62 and the reference image data from the frame memory 70, thereby generating the predicted image data. Then, the inter-prediction section 90 outputs the generated predicted image data to the selector 71b.

6. FLOW OF PROCESS DURING DECODING

Figure 20:
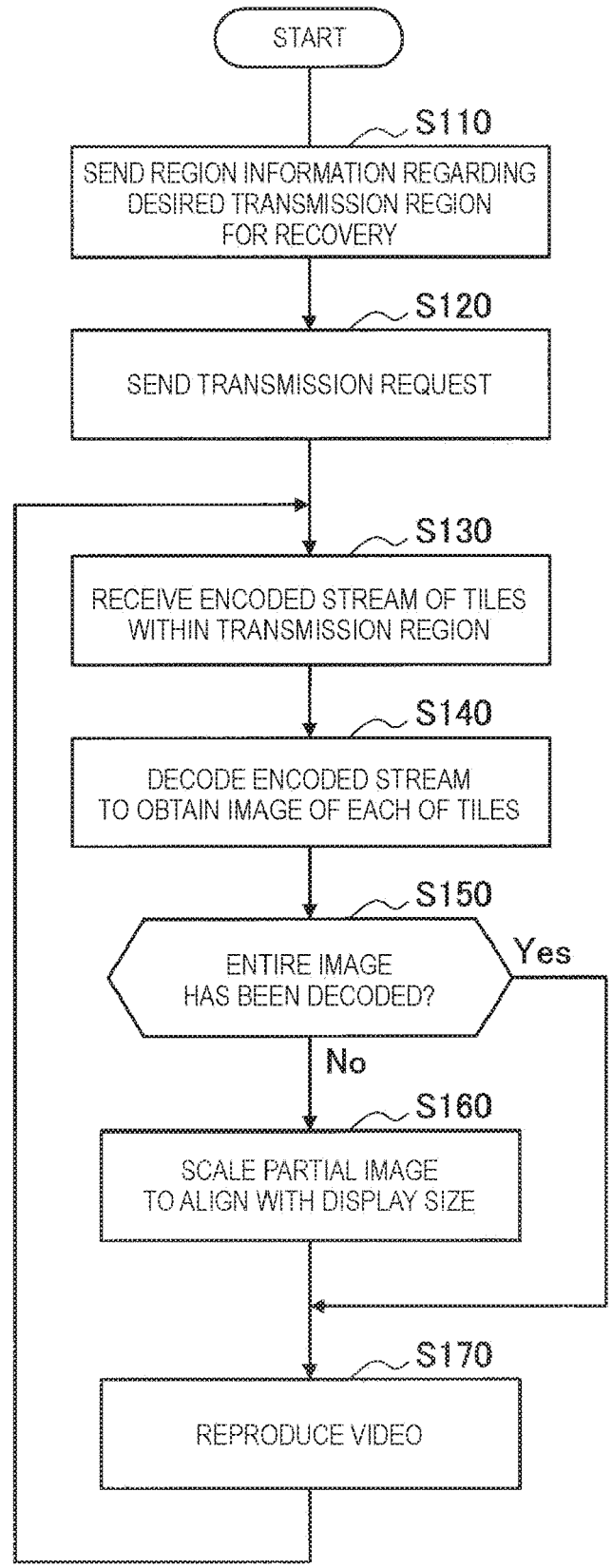
FIG. 20 is a flowchart illustrating an example of a flow of a transmission control process at a decoding side according to an embodiment.

FIG. 20 is a flowchart illustrating an example of a flow of a transmission control process at a decoding side according to an embodiment. Note that process steps performed by the decoding apparatus 60 that are not directly related to the subject matter of the technology according to the present disclosure are omitted from illustrations for the sake of clarity of explanation.

First, the transmission control section 61 sends region information regarding the transmission region for recovery, for example, designated by a user to the encoding apparatus 10 which is a transmission source of a video (step S110). In a case where the transmission region for recovery is determined at the encoding side, this step may be omitted.

Next, transmission control section 61 sends a request for transmission of an encoded stream of a video content to the encoding apparatus 10 (step S120). Herein, real-time transmission or at least low latency transmission of the video content is typically requested. In response to the transmission request that is sent herein, transmission of an encoded stream is started and then subsequent process steps from step S130 through S170 will be repeated picture by picture.

In each repetition for a picture, the transmission control section 61 receives an encoded stream corresponding to one or more tiles within the transmission region that is set currently (step S130).

Next, an image of each of tiles is decoded from the encoded stream through decoding of quantized data at the lossless decoding section 62, de-quantization of transform coefficient data at the inverse quantization section 63, generation of prediction error data at the inverse orthogonal transform section 64, addition of the predicted image data and the prediction error data and so on (step S140).

Next, the reproduction control section 69 determines whether the entire image has been decoded or only a partial image has been decoded (step S150). In a case where only a partial image has been decoded, the reproduction control section 69 scales the partial image to align it with the display size (step S160). Then, the reproduction control section 69 outputs image signals to a display thereby reproducing the video (step S170).

7. EXAMPLE OF HARDWARE CONFIGURATION

The above-described embodiment can be realized using any of software, hardware, and a combination of software and hardware. In the case where the encoding apparatus 10 or the decoding apparatus 60 uses software, a program that constitutes the software may be stored in, for example, a storage medium (a non-transitory media) provided inside or outside the apparatus in advance. Then, each program is read into, for example, a random access memory (RAM) for its execution and executed by a processor such as a central processing unit (CPU).

Figure 21:
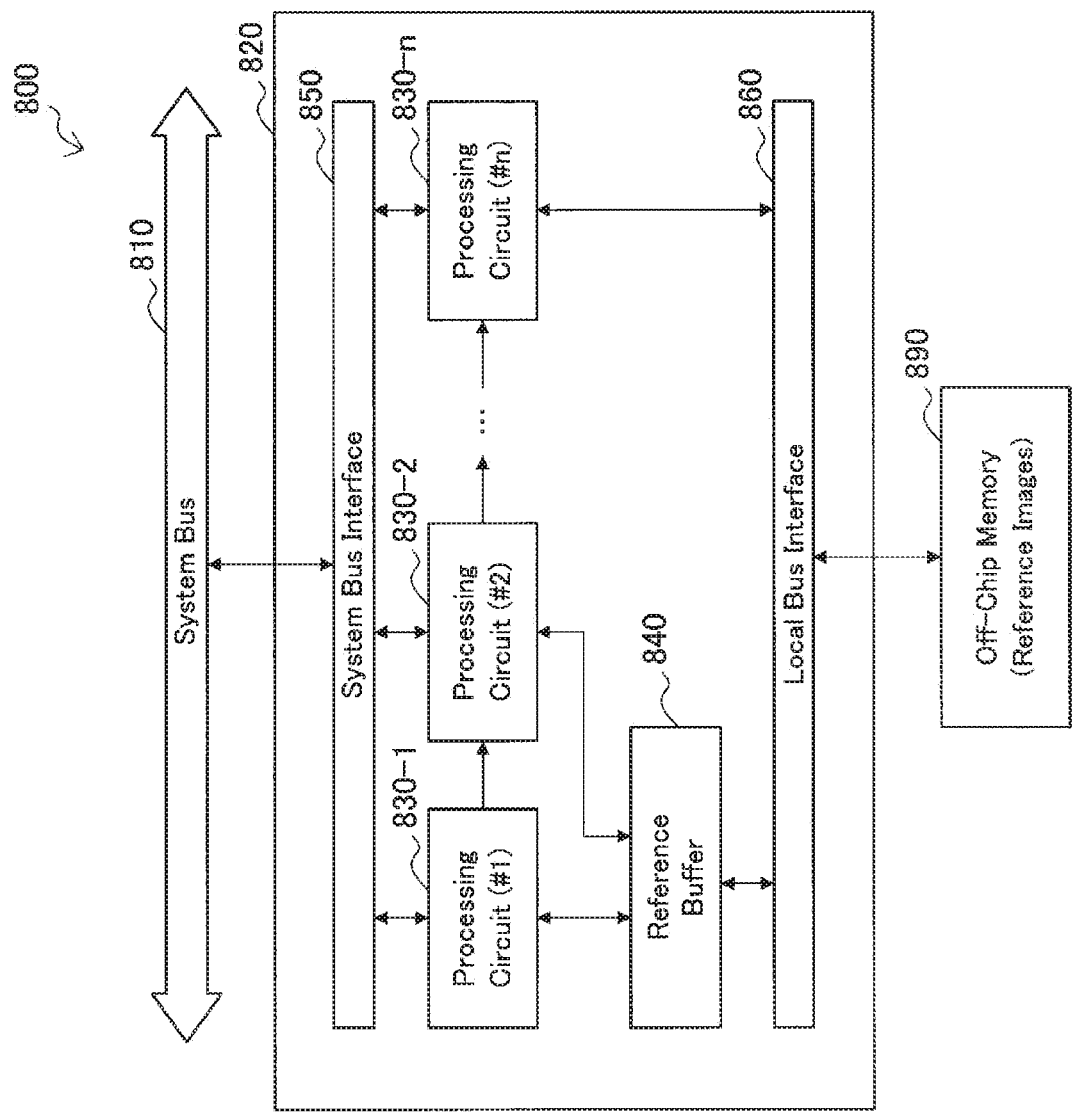
FIG. 21 is a block diagram illustrating an example of a hardware configuration of an apparatus.

FIG. 21 is a block diagram illustrating an example of a hardware configuration of an apparatus. Referring to FIG. 21, an image processing apparatus 800 has a system bus 810, an image processing chip 820, and an off-chip memory 890. The image processing chip 820 includes n (n is equal to or greater than 1) processing circuits 830-1, 830-2, . . . , and 830-n, a reference buffer 840, a system bus interface 850, and a local bus interface 860.

The system bus 810 provides a communication path between the image processing chip 820 and external modules (e.g., a central control function, an application function, a communication interface, a user interface, etc.). The processing circuits 830-1, 830-2, . . . , and 830-n are connected to the system bus 810 via the system bus interface 850 and to the off-chip memory 890 via the local bus interface 860. The processing circuits 830-1, 830-2, . . . , and 830-n can also access the reference buffer 840 that can correspond to an on-chip memory (e.g., an SRAM). The off-chip memory 890 may be, for example, a frame memory that stores image data processed by the image processing chip 820. As an example, the processing circuits 830-1 and 830-2 may be utilized for encoding processes or decoding processes that are performed in parallel across tiles. Note that these processing circuits may also be formed on individual chips, rather than on the same image processing chip 820. The image processing apparatus 800 may be the encoding apparatus 10 or the decoding apparatus 60 itself or may be a module that is mounted in those apparatuses.

8. APPLICATION EXAMPLES

The encoding apparatus 10 and the decoding apparatus 60 according to the above-described embodiments can be applied to various electronic apparatuses such as: transmitters or receivers for satellite broadcasting, wired broadcasting such as cable TV, distribution on the Internet and distribution to terminals through cellular communication; recording devices which record images on media such as optical discs, magnetic disks, and flash memories; or reproduction devices which reproduce images from the foregoing storage media. Four application examples will be described below.

(1) First Application Example

Figure 22:
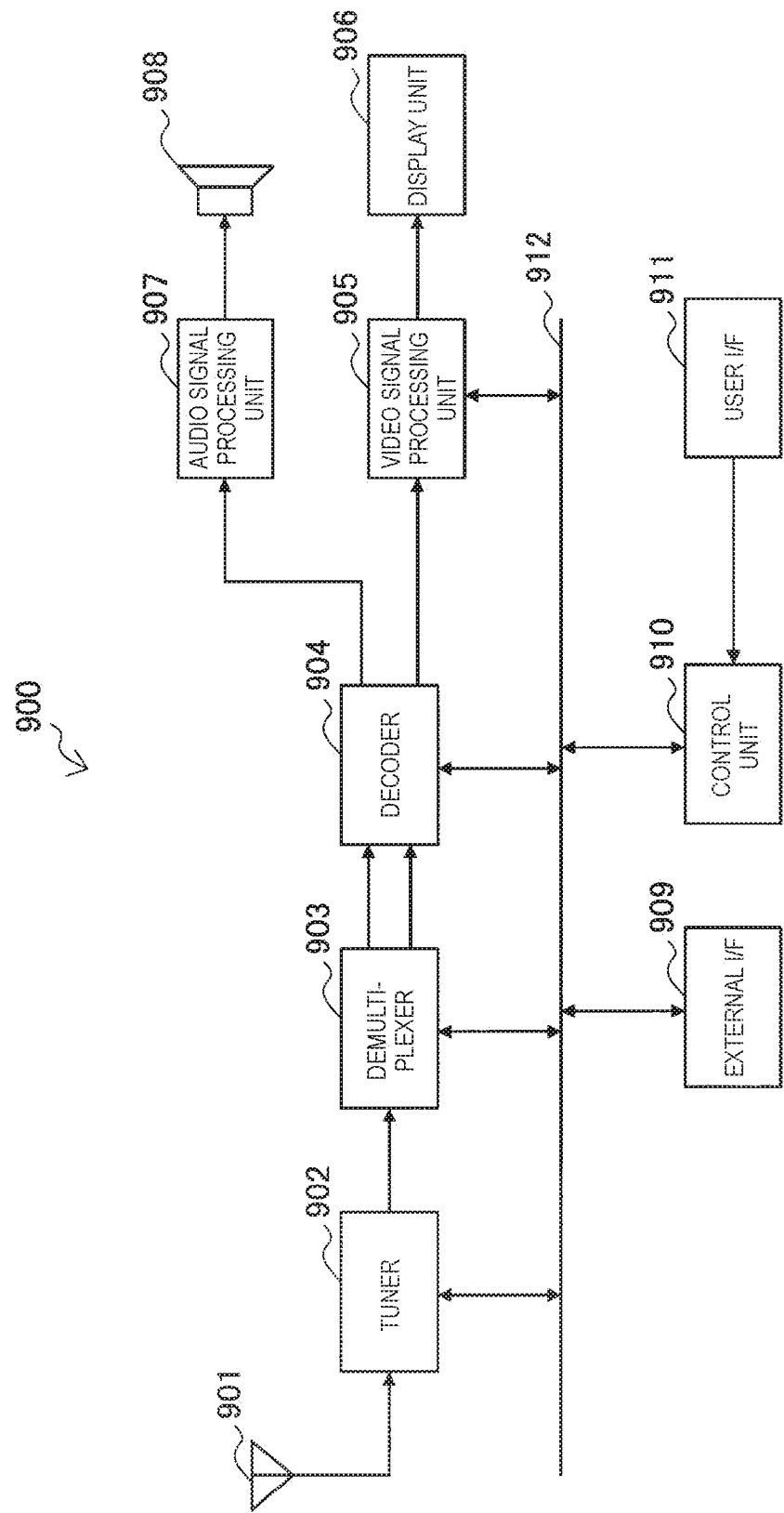
FIG. 22 is a block diagram illustrating an example of a schematic configuration of a television apparatus.

FIG. 22 illustrates an example of a schematic configuration of a television apparatus to which the above-described embodiment is applied. The television apparatus 900 has an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcasting signal received via the antenna 901 and demodulates the extracted signal. Then, the tuner 902 outputs an encoded bit stream obtained from the demodulation to the demultiplexer 903. That is, the tuner 902 plays a role as a transmission means of the television apparatus 900 which receives an encoded stream in which images are encoded. The demultiplexer 903 demultiplexes a video stream and an audio stream of a program to be viewed from the encoded stream and outputs the demultiplexed streams to the decoder 904. In addition, the demultiplexer 903 extracts auxiliary data such as an electronic program guide (EPG) from the encoded bit stream and supplies the extracted data to the control unit 910. Note that, in the case where the encoded bit stream has been scrambled, the demultiplexer 903 may perform descrambling.

The decoder 904 decodes the video stream and the audio stream input from the demultiplexer 903. Then, the decoder 904 outputs video data generated from the decoding process to the video signal processing unit 905. In addition, the decoder 904 outputs audio data generated from the decoding process to the audio signal processing unit 907.

The video signal processing unit 905 reproduces the video data input from the decoder 904 to cause the display unit 906 to display a video. In addition, the video signal processing unit 905 may cause the display unit 906 to display an application screen supplied via a network. Furthermore, the video signal processing unit 905 may perform an additional process, for example, noise reduction, on the video data in accordance with a setting. Moreover, the video signal processing unit 905 may generate an image of a graphical user interface (GUI), for example, a menu, a button, or a cursor and superimpose the generated image on an output image.

The display unit 906 is driven with a driving signal supplied from the video signal processing unit 905 and displays a video or an image on a video plane of a display device (e.g., a liquid crystal display, a plasma display, an OLED, etc.).

The audio signal processing unit 907 performs a reproduction process including D/A conversion and amplification on the audio data input from the decoder 904 and causes the speaker 908 to output a sound. In addition, the audio signal processing unit 907 may perform an additional process such as noise removal on the audio data.

The external interface 909 is an interface for connecting the television apparatus 900 to an external apparatus or a network. For example, a video stream or an audio stream received via the external interface 909 may be decoded by the decoder 904. In other words, the external interface 909 also plays the role as a transmission means of the television apparatus 900 which receives an encoded stream in which images are encoded.

The control unit 910 has a processor such as a central processing unit (CPU) and a memory such as a random access memory (RAM) and a read only memory (ROM). The memory stores a program executed by the CPU, program data, EPG data, and data acquired via a network. The program stored in the memory is read and executed by the CPU at the time of, for example, start-up of the television apparatus 900. The CPU controls operations of the television apparatus 900 by executing the program in response to, for example, operation signals input from the user interface 911.

The user interface 911 is connected to the control unit 910. The user interface 911 includes, for example, buttons and switches with which a user operates the television apparatus 900, a reception unit for remote control signals, and the like. The user interface 911 generates an operation signal by detecting an operation by a user via any aforementioned constituent element and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to one another.

The decoder 904 has the function of the decoding apparatus 60 according to the above-described embodiments in the television apparatus 900 configured as described above. Thus, a risk that a transmission delay or another decoding failure occurs during recovery after a loss or an absence of necessary encoded information for decoding a video will be reduced in the television apparatus 900.

(2) Second Application Example

Figure 23:
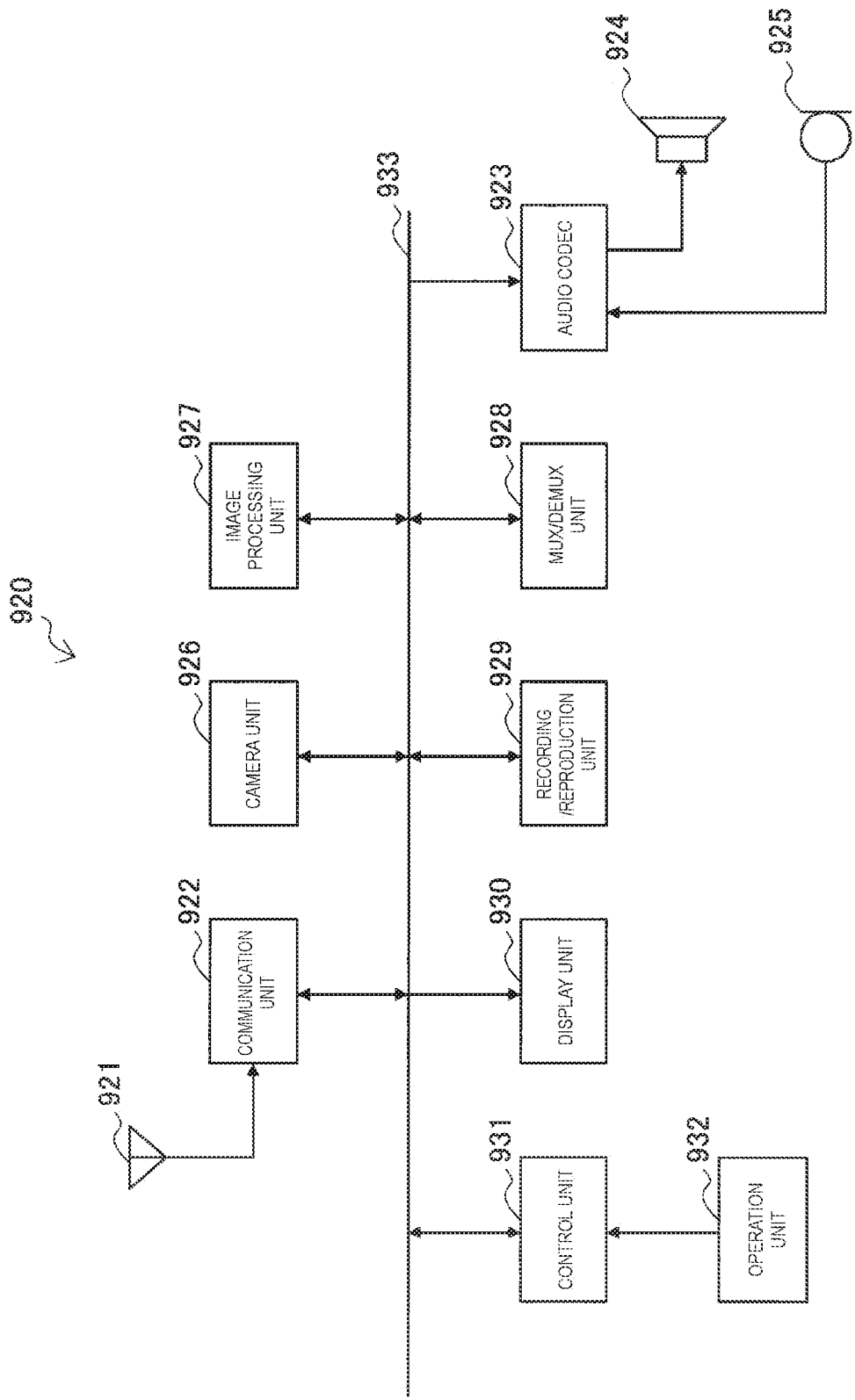
FIG. 23 is a block diagram illustrating an example of a schematic configuration of a mobile phone.

FIG. 23 illustrates an example of a schematic configuration of a mobile telephone to which the above-described embodiments are applied. A mobile telephone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/demultiplexing unit 928, the recording/reproducing unit 929, the display unit 930, and the control unit 931.

The mobile telephone 920 performs actions such as transmitting/receiving an audio signal, transmitting/receiving an electronic mail or image data, capturing an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, performs frequency conversion, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then supplies the generated audio signal to the speaker 924 to cause it to output the audio.

In the data communication mode, for example, the control unit 931 generates character data configuring an electronic mail, in accordance with a user operation detected through the operation unit 932. The control unit 931 further displays characters on the display unit 930. Moreover, the control unit 931 generates electronic mail data in accordance with an instruction to send it obtained from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, performs frequency conversion, and acquires a reception signal. The communication unit 922 thereafter demodulates and decodes the reception signal, restores the electronic mail data, and outputs the restored electronic mail data to the control unit 931. The control unit 931 displays the content of the electronic mail on the display unit 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB memory, or a memory card.

In the photography mode, for example, the camera unit 926 images an object to generate image data and outputs the generated image data to the image processing unit 927. The image processing unit 927 encodes the image data input from the camera unit 926 and stores an encoded stream in the storage medium of the recording/reproducing unit 929.

In the videophone mode, for example, the multiplexing/demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 then transmits the generated transmission signal to the base station (not shown) through the antenna 921. Moreover, the communication unit 922 amplifies a radio signal received through the antenna 921, performs frequency conversion, and acquires a reception signal. The transmission signal and the reception signal can include an encoded bit stream. The communication unit 922 thus demodulates and decodes the reception signal to restore the stream, and outputs the restored stream to the multiplexing/demultiplexing unit 928. The multiplexing/demultiplexing unit 928 demultiplexes the video stream and the audio stream from the input stream and outputs the video stream and the audio stream to the image processing unit 927 and the audio codec 923, respectively. The image processing unit 927 decodes the video stream to generate video data. The video data is then supplied to the display unit 930, which displays a series of images. The audio codec 923 expands and performs D/A conversion on the audio stream to generate an analog audio signal. The audio codec 923 then supplies the generated audio signal to the speaker 924 to cause it to output the audio.

In the mobile telephone 920 configured like this, the image processing unit 927 has the functions of the encoding apparatus 10 and the decoding apparatus 60 according to the above-described embodiments. Thus, the mobile telephone 920 can reduce the risk that a transmission delay or another decoding failure occurs during recovery after a loss or an absence of encoded information.

(3) Third Application Example

Figure 24:
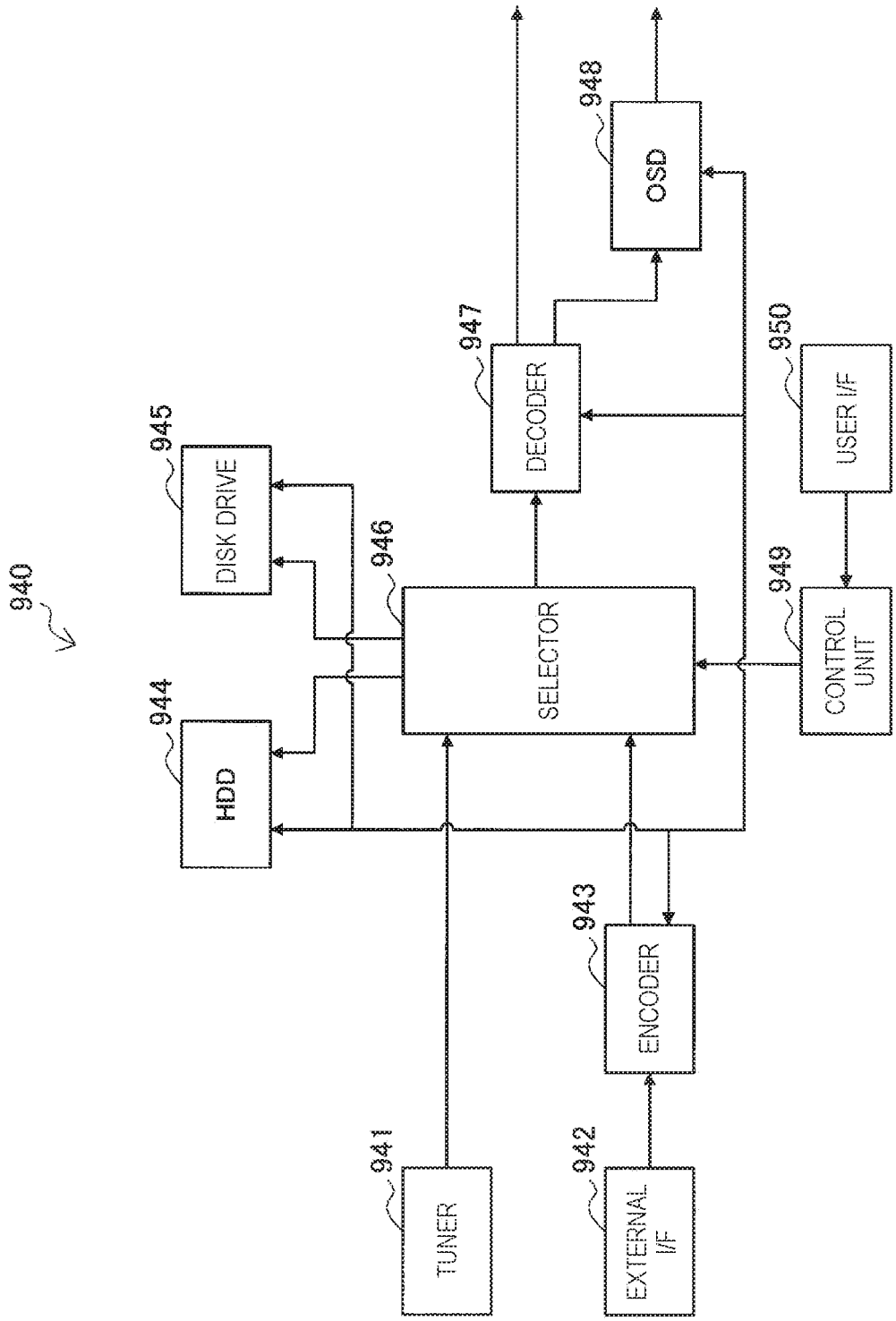
FIG. 24 is a block diagram illustrating an example of a schematic configuration of a recording/reproduction device.

FIG. 24 illustrates an example of a schematic configuration of a recording/reproducing apparatus to which the above-described embodiments are applied. The recording/reproducing apparatus 940 encodes audio data and video data of a received broadcast program and records the data into a recording medium, for example. The recording/reproducing apparatus 940 may also encode audio data and video data acquired from another apparatus and record the data into the recording medium, for example. The recording/reproducing apparatus 940 reproduces the data recorded in the recording medium on a monitor and a speaker, for example, in response to a user instruction. In this case, recording/reproducing apparatus 940 decodes the audio data and the video data.

The recording/reproducing apparatus 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing apparatus 940.

The external interface 942 is an interface which connects the recording/reproducing apparatus 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing apparatus 940.

The encoder 943 encodes the video data and the audio data in the case where the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when the video and the audio are reproduced.

The disk drive 945 records and reads data into/from a recording medium attached to the disk drive. The recording medium attached to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, buttons, or a cursor onto the displayed video.

The control unit 949 includes a processor such as a CPU and a memory such as a RAM and a ROM. The memory stores a program executed by the CPU as well as program data. The program stored in the memory is read by the CPU at the start-up of the recording/reproducing apparatus 940 and executed, for example. By executing the program, the CPU controls the operation of the recording/reproducing apparatus 940 in accordance with an operation signal that is input from the user interface 950, for example.

The user interface 950 is connected to the control unit 949. The user interface 950 includes a button and a switch for a user to operate the recording/reproducing apparatus 940 as well as a reception part which receives a remote control signal, for example. The user interface 950 detects a user operation through these components to generate an operation signal, and outputs the generated operation signal to the control unit 949.

In the recording/reproducing apparatus 940 configured like this, the encoder 943 has the function of the encoding apparatus 10 according to the above-described embodiments. In addition, the decoder 947 has the function of the decoding apparatus 60 according to the above-described embodiments. Thus, the recording/reproducing apparatus 940 can reduce the risk that a transmission delay or another decoding failure occurs during recovery after a loss or an absence of encoded information.

(4) Fourth Application Example

Figure 25:
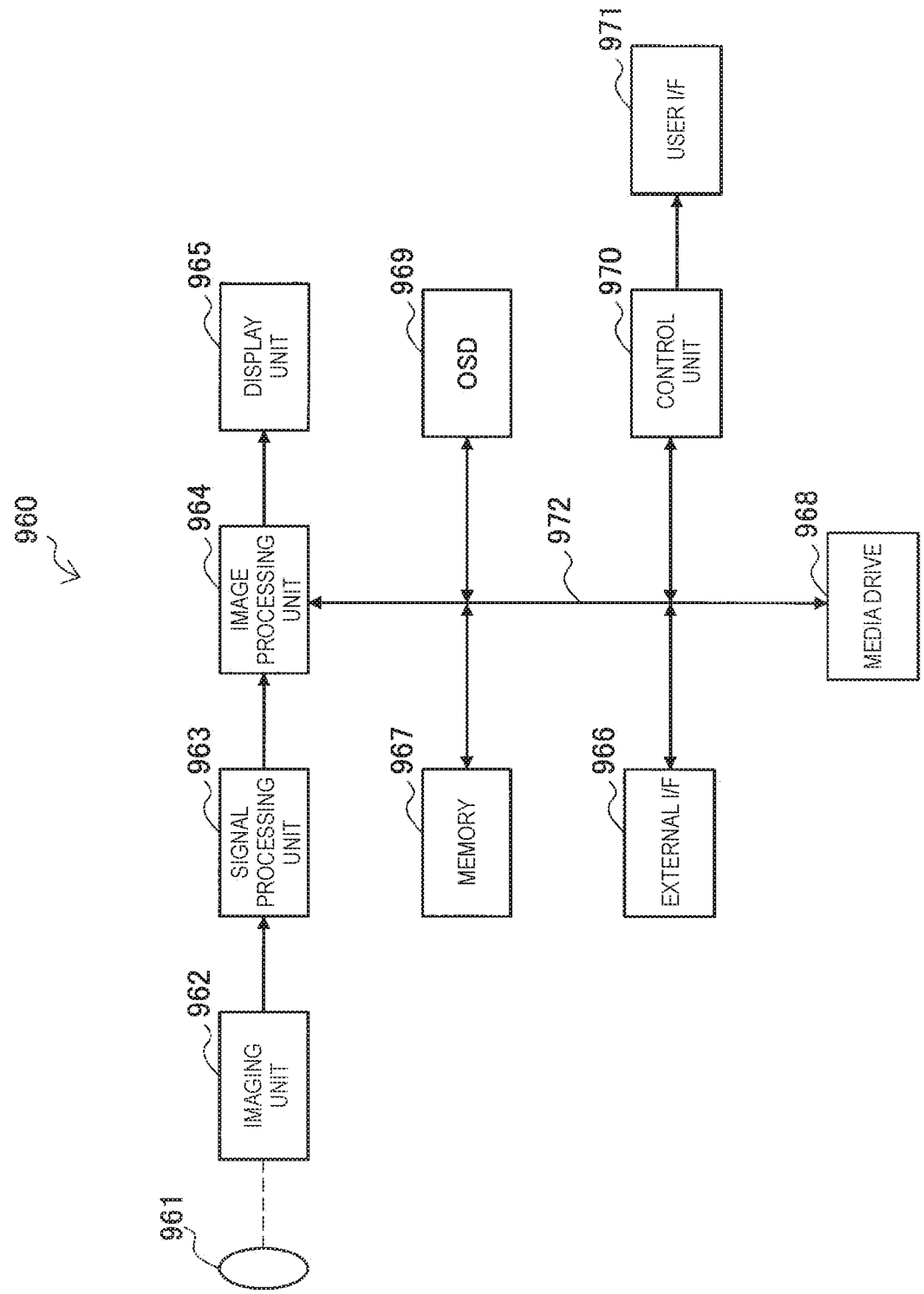
FIG. 25 is a block diagram illustrating an example of a schematic configuration of an imaging apparatus.

FIG. 25 illustrates an example of a schematic configuration of an imaging apparatus to which the above-described embodiments are applied. The imaging apparatus 960 images an object to generate an image, encodes image data, and records the data into a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of an object on an imaging plane of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging plane into an image signal as an electric signal. Then, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal processes have been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display unit 965. Moreover, the image processing unit 964 may output to the display unit 965 the image data input from the signal processing unit 963 to cause the display unit 965 to display the image. Furthermore, the image processing unit 964 may superpose display data acquired from the OSD 969 onto the image that is output on the display unit 965.

The OSD 969 generates an image of a GUI such as a menu, buttons, or a cursor and outputs the generated image to the image processing unit 964.

The external interface 966 is configured as a USB input/output terminal, for example. The external interface 966 connects the imaging apparatus 960 with a printer when printing an image, for example. Moreover, a drive is connected to the external interface 966 as needed. A removable medium such as a magnetic disk or an optical disk is attached to the drive, for example, so that a program read from the removable medium can be installed to the imaging apparatus 960. The external interface 966 may also be configured as a network interface that is connected to a network such as a LAN or the Internet. That is, the external interface 966 has a role as transmission means in the imaging apparatus 960.

The recording medium attached to the media drive 968 may be an arbitrary removable medium that is readable and writable such as a magnetic disk, a magneto-optical disk, an optical disk, or a semiconductor memory. Furthermore, the recording medium may be attached to the media drive 968 in a fixed manner so that a non-transportable storage unit such as a built-in hard disk drive or a solid state drive (SSD) is configured, for example.

The control unit 970 includes a processor such as a CPU and a memory such as a RAM and a ROM. The memory stores a program executed by the CPU as well as program data. The program stored in the memory is read by the CPU at the start-up of the imaging apparatus 960 and then executed. By executing the program, the CPU controls the operation of the imaging apparatus 960 in accordance with an operation signal that is input from the user interface 971, for example.

The user interface 971 is connected to the control unit 970. The user interface 971 includes buttons and switches for a user to operate the imaging apparatus 960, for example. The user interface 971 detects a user operation through these components to generate an operation signal, and outputs the generated operation signal to the control unit 970.

In the imaging apparatus 960 configured like this, the image processing unit 964 has the functions of the encoding apparatus 10 and the decoding apparatus 60 according to the above-described embodiments. Thus, the imaging apparatus 960 can reduce the risk that a transmission delay or another decoding failure occurs during recovery after a loss or an absence of encoded information.

9. CONCLUSION

Embodiments of the technology according to the present disclosure have been described so far in detail using FIGS. 1A, 1B, 2A, 2B, 3, 4, 5, 6A, 6B, 6C, 7, 8, 9, 10, 11, 12, 13A, 13B, 14, 15, 16A, 16B, 17, 18, 19, 20, 21, 22, 23, 24, and 25. According to the above-described embodiments, a partial region including one or more of a plurality of tiles of an image included in a video to be encoded is set for the image, and out-of-tile reference for motion compensation for the tiles within the partial region is set to be prohibited. Further, in a case where an encoded stream of the video is transmitted to a decoding apparatus, upon detection of a loss or an absence of encoded information at the decoding apparatus, the transmission is restricted such that only an encoded stream corresponding to the tiles within the partial region is transmitted. That is, as the transmitted region is not kept to be the entire picture but rather temporarily shrunk to the partial region in a situation where a recovery is required, it is possible to increase an available bandwidth for refresh using intra tiles to reduce the risk that a transmission delay or another decoding failure occurs. Moreover, since an error does not propagate tile to tile within the partial region, continuous and stable decoding and reproduction of a video content during recovery is guaranteed. Further, because the parameters for controlling reference relationship that have been designed for the purpose of parallel processing across tiles can be utilized to implement the above mechanism, it may be more easily implemented compared to the technique which uses slices for which no similar parameters are provided.

Additionally, according to the above-described embodiments, a tile within the partial region, that has become non-decodable due to the loss or the absence of encoded information is encoded as an intra tile, and an encoded stream corresponding to the intra tile is transmitted during recovery. As a result of prohibition of out-of-tile reference, the impact of the loss or absence of encoded information will be localized only to the tile of which information is directly lost. If the region to be encoded as intra tiles is such a small region, an increase in an amount of codes caused by refresh using intra tiles will also be suppressed.

Additionally, according to the above-described embodiments, the partial region is extended progressively tile by tile during recovery, and a tile corresponding to a newly extended part of the partial region is encoded as an intra tile. Therefore, even when a network bandwidth is limited, it is possible to achieve recovery of the entire image as time proceeds while securing stable reproduction of the video content within the original partial region. It is also possible, during a time when the transmission is restricted, to extend the above partial region at an arbitrary timing that is determined on the basis of availability of transmission bandwidth. Hence, a coincidence of increase in an amount of codes due to varied image content and increase in the amount of codes due to usage of intra tiles, which would otherwise disturb the real-time performance or cause degradation of image quality, can be avoided.

Additionally, as an example, when the partial region that is decodable during recovery is not rectangular, it is possible at an encoder to set each tile to be displayed or not to be displayed such that an image decoded at the decoding side is displayed rectangularly using standard parameters. In this case, a decoder can reproduce a natural rectangular video only by acting in accordance with a standard specification.

Additionally, according to the above-described embodiments, the partial region may be predefined, input by a user (at either the encoding or the decoding side) or set on the basis of analysis of the video, as a region of interest at a user level or an application level. Therefore, in a situation where a network bandwidth is limited, a stable video can be provided putting more importance on the region of interest even when an event such as a packet loss has occurred.

It should be noted that, although the term "tiles" is used in this specification according to the standard terminology used in HEVC, the scope of the technology according to the present disclosure is not limited by any meanings of terms that is not related to the subject matter thereof. Depending on a future standardization or other agreements, another term which means small regions (smaller than a picture) that enable inter-region reference relationship to be controlled may be used instead of "tiles".

Mainly described herein is the example where information regarding tiles is inserted into an encoded stream and transmitted from the encoding side to the decoding side. The way to transmit such information, however, is not limited to the above example. For example, such information may be transmitted or recorded as separate data associated with the encoded bit stream without being multiplexed to the encoded bit stream. Here, the term "association" means to allow images included in a bit stream to be linked with information corresponding to the images when decoding. Namely, the information may be transmitted on a different transmission path than that for images (or a bit stream). The information may also be recorded in a different recording medium (or in a different recording area of the same recording medium) than that for images (or a bit stream). Furthermore, the information and images (or a bit stream) may be associated with each other by an arbitrary unit such as a plurality of frames, one frame, or a portion within a frame.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An encoding apparatus including:

a setting section configured to partition each of images included in a video to be encoded into a plurality of tiles and set a partial region including one or more of the plurality of tiles for the image;

an encoding section configured to encode each image on a per-tile basis to generate an encoded stream; and a transmission control section configured to control transmission of the encoded stream to a decoding apparatus that decodes the video, in which the setting section is configured to set out-of-tile reference for motion compensation for the tiles within the partial region to be prohibited, and the transmission control section is configured to restrict, upon detection of a loss or an absence of encoded information at the decoding apparatus, the transmission such that only an encoded stream corresponding to the tiles within the partial region is transmitted.

(2)

The encoding apparatus according to (1), in which the encoding section is configured to encode, as an intra tile, a tile within the partial region, that has become non-decodable due to the loss or the absence of encoded information, and an encoded stream corresponding to the intra tile is transmitted to the decoding apparatus during a time when the transmission is restricted by the transmission control section.

(3)

The encoding apparatus according to (1) or (2), in which the setting section is configured to progressively extend the partial region tile by tile during a time when the transmission is restricted by the transmission control section, and the encoding section is configured to encode, as an intra tile, a tile corresponding to a newly extended part of the partial region.

(4)

The encoding apparatus according to (3), in which tiles outside the partial region that have become non-decodable due to the loss or the absence of encoded information are to be decodable through the progressive extension of the partial region.

(5)

The encoding apparatus according to (3) or (4), in which the setting section is configured to reset the partial region after all tiles have become decodable through the progressive extension of the partial region.

(6)

The encoding apparatus according to any one of (3) to (5), in which the setting section is configured to extend the partial region at a timing determined dynamically on the basis of availability of transmission bandwidth during a time when the transmission is restricted by the transmission control section.

(7)

The encoding apparatus according to any one of (3) to (6), in which the setting section is configured to set, in a case where the partial region is not rectangular, each tile to be displayed or not to be displayed such that an image decoded by the decoding apparatus is displayed rectangularly.

(8)

The encoding apparatus according to any one of (1) to (7), in which the setting section is configured to set the partial region for the image on the basis of predefined region information or region information input by a user or on the basis of analysis of the video.

(9)

The encoding apparatus according to any one of (1) to (7), in which the setting section is configured to set the partial region for the image on the basis of region information received from the decoding apparatus.

(10)

The encoding apparatus according to any one of (1) to (9), in which the transmission control section is configured to detect the loss of necessary encoded information in a case where a packet transmitted to the decoding apparatus has been lost.

(11)

The encoding apparatus according to any one of (1) to (9), in which the transmission control section is configured to detect the absence of necessary encoded information in a case where a cut-in reproduction of the video has been requested.

(12)

The encoding apparatus according to any one of (1) to (11), in which the transmission control section is configured to restrict, also in a case where it is determined on the basis of an analysis of the video that a scene change has occurred, the transmission such that only an encoded stream corresponding to the tiles within the partial region is transmitted.

(13)

The encoding apparatus according to any one of (1) to (12), in which the setting section is configured to set a first partial region and a second partial region for the image, the second partial region being smaller than the first partial region, and the transmission control section is configured to restrict the transmission such that only an encoded stream corresponding to the tiles within the first partial region is transmitted in a case where a packet transmitted to the decoding apparatus has been lost and only an encoded stream corresponding to the tiles within the second partial region is transmitted in a case where a cut-in reproduction of the video has been requested.

(14)

The encoding apparatus according to any one of (1) to (13), in which the encoding section is configured to encode each image in accordance with high efficiency video coding (HEVC) scheme, and a parameter indicating that out-of-tile reference for motion compensation for a tile within the partial region is set to be prohibited is included in a supplemental enhancement information (SEI) message.

(15)

A transmission control method of controlling, in an encoding apparatus, transmission of a video to a decoding apparatus, the method including:

partitioning each of images included in a video to be encoded into a plurality of tiles;

setting a partial region including one or more of the plurality of tiles for the image;

encoding each image on a per-tile basis to generate an encoded stream; and controlling transmission of the encoded stream to the decoding apparatus, in which out-of-tile reference for motion compensation for the tiles within the partial region is set to be prohibited, and upon detection of a loss or an absence of encoded information at the decoding apparatus, the transmission is restricted such that only an encoded stream corresponding to the tiles within the partial region is transmitted.

(16)

A decoding apparatus including:

a transmission control section configured to provide an encoding apparatus with region information regarding a partial region including one or more of a plurality of tiles of an image included in a video to be decoded, the encoding apparatus being a transmission source of the video; and a decoding section configured to decode an encoded stream of the video received from the encoding apparatus to obtain the video, in which, in a normal operation, an encoded stream corresponding to all of the plurality of tiles is received, and upon detection of a loss or an absence of necessary encoded information, only an encoded stream corresponding to the tiles within the partial region being set on the basis of the region information is received with out-of-tile reference for motion compensation for the tiles within the partial region prohibited.

(17)

The decoding apparatus according to (16), in which a tile within the partial region that has become non-decodable due to the loss or the absence of the encoded information is encoded as an intra tile, and a stream corresponding to the intra tile is received from the encoding apparatus during a time when a target of transmission of the encoded stream is restricted to the partial region.

(18)

The decoding apparatus according to (16) or (17), further including:

a reproduction control section configured to control reproduction of the video decoded by the decoding section, in which the reproduction control section is configured to scale an image of the partial region to fit with a frame size, the image of the partial region being partially decoded upon detection of the loss or the absence of the encoded information.

(19)

A transmission control method of controlling, in a decoding apparatus, transmission of a video from an encoding apparatus, the method including:

providing an encoding apparatus with region information regarding a partial region including one or more of a plurality of tiles of an image included in a video to be decoded, the encoding apparatus being a transmission source of the video;

receiving an encoded stream of the video from the encoding apparatus; and decoding the received encoded stream to obtain the video, in which, in a normal operation, the encoded stream corresponding to all of the plurality of tiles is received, and upon detection of a loss or an absence of necessary encoded information, only an encoded stream corresponding to the tiles within the partial region being set on the basis of the region information is received with out-of-tile reference for motion compensation for the tiles within the partial region prohibited.

REFERENCE SIGNS LIST 1 image processing system
10 encoding apparatus
12 tile setting section
16 lossless encoding section
17 transmission control section
60 decoding apparatus
61 transmission control section
62 lossless decoding section
69 reproduction control section

What is claimed is:

1. A decoding apparatus, comprising:
a processor configured to:
transmit, to an encoding apparatus, a signal indicating detection of one of a loss or an absence of entire encoded information corresponding to an image including a partial region;
receive, from the encoding apparatus, first partial encoded information corresponding to a first intra tile to be included in the partial region, wherein
the first intra tile corresponds to a non-decodable tile obtained due to the loss or the absence of the entire encoded information corresponding to the image;
decode the first partial encoded information of the first intra tile to recover the partial region;
receive, from the encoding apparatus, second partial encoded information corresponding to a second intra tile adjacent to the recovered partial region after finishing the recovering of the partial region;
decode the second intra tile; and
control, in response to the decoding of the first intra tile and the second intra tile, a display screen to display the image while gradually recovering the loss or the absence of the entire encoded information corresponding to the image.

2. The decoding apparatus according to claim 1, wherein the processor is further configured to:
set, as the partial region, a requested region based on a user input via a user interface while the image is displayed; and
transmit, to the encoding apparatus, region information indicating the requested region before the one of the loss or the absence of entire encoded information is detected.

3. The decoding apparatus according to claim 1, wherein the processor is further configured to decode the first intra tile and the second intra tile based on an intra prediction while prohibiting reference from the first intra tile and the second intra tile to an outside of the partial region.

4. A decoding method, comprising:
transmitting, to an encoding apparatus, a signal indicating detection of one of a loss or an absence of entire encoded information corresponding to an image including a partial region;
receiving, from the encoding apparatus, first partial encoded information corresponding to a first intra tile to be included in the partial region, wherein
the first intra tile corresponds to a non-decodable tile obtained due to the loss or the absence of the entire encoded information corresponding to the image;
decoding the first partial encoded information of the first intra tile to recover the partial region;
receiving, from the encoding apparatus, second partial encoded information corresponding to a second intra tile adjacent to the recovered partial region after finishing the recovering of the partial region;
decoding the second intra tile; and
controlling, in response to the decoding of the first intra tile and the second intra tile, a display screen to display the image while gradually recovering the loss or the absence of the entire encoded information corresponding to the image.

5. The decoding method according to claim 4, further comprising
setting, as the partial region, a requested region based on a user input via a user interface while the image is displayed; and
transmitting, to the encoding apparatus, region information indicating the requested region before the one of the loss or the absence of entire encoded information is detected.

6. The decoding method according to claim 4, further comprising
prohibiting, in an intra prediction for decoding the first intra tile and the second intra tile, reference from the first intra tile and the second intra tile to an outside of the partial region.

* * * * *